(12) United States Patent
Haruki et al.

(10) Patent No.: US 8,191,155 B2
(45) Date of Patent: May 29, 2012

(54) MICROPROCESSOR

(75) Inventors: Hiroyoshi Haruki, Kanagawa (JP);
Mikio Hashimoto, Kanagawa (JP);
Takeshi Kawabata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1052 days.

(21) Appl. No.: 11/060,704

(22) Filed: Feb. 18, 2005

(65) Prior Publication Data

US 2005/0289397 A1 Dec. 29, 2005

(30) Foreign Application Priority Data

Jun. 24, 2004 (JP) .................................. 2004-186911
Aug. 3, 2004 (JP) .................................. 2004-226885

(51) Int. Cl.
*H04L 29/06* (2006.01)
(52) U.S. Cl. ........................................................ 726/27
(58) Field of Classification Search .................... 726/27
See application file for complete search history.

(56) References Cited

U.S. PATENT DOCUMENTS

| | | | |
|---|---|---|---|
| 5,825,878 A * | 10/1998 | Takahashi et al. ............ 713/190 |
| 6,983,374 B2 | 1/2006 | Hashimoto et al. |
| 2001/0014157 A1 | 8/2001 | Hashimoto et al. |
| 2001/0018736 A1 * | 8/2001 | Hashimoto et al. ............... 713/1 |
| 2002/0051536 A1 | 5/2002 | Shirakawa et al. |
| 2002/0053024 A1 | 5/2002 | Hashimoto et al. |
| 2002/0101995 A1 | 8/2002 | Hashimoto et al. |
| 2003/0023871 A1 | 1/2003 | Gnanasabapathy et al. |
| 2003/0033537 A1 * | 2/2003 | Fujimoto et al. ............... 713/193 |
| 2003/0065933 A1 | 4/2003 | Hashimoto et al. |
| 2003/0126458 A1 | 7/2003 | Teramoto et al. |
| 2003/0182571 A1 | 9/2003 | Hashimoto et al. |
| 2004/0030911 A1 | 2/2004 | Isozaki et al. |
| 2004/0125957 A1 * | 7/2004 | Rauber et al. ................. 380/259 |
| 2004/0139341 A1 | 7/2004 | Yamaguchi et al. |
| 2004/0143748 A1 | 7/2004 | Yamaguchi et al. |
| 2005/0027985 A1 * | 2/2005 | Sprunk et al. .................. 713/171 |
| 2005/0091499 A1 * | 4/2005 | Forlenza et al. ............... 713/176 |
| 2005/0177749 A1 * | 8/2005 | Ovadia .......................... 713/201 |
| 2005/0216763 A1 * | 9/2005 | Lee et al. ....................... 713/200 |
| 2005/0289397 A1 * | 12/2005 | Haruki et al. .................... 714/38 |

FOREIGN PATENT DOCUMENTS

| | | |
|---|---|---|
| CN | 1309351 A | 8/2001 |
| JP | 05-265867 | 10/1993 |
| JP | 2001-223687 | 8/2001 |
| JP | 2001-318787 | 11/2001 |
| JP | 2001318787 A * | 11/2001 |

(Continued)

OTHER PUBLICATIONS

David Lie, et al., "Architectural Support Copy and for Tamper Resistant Software", Proceedings of ASPLOS 2000, Nov. 2000, 10 Pages.

(Continued)

*Primary Examiner* — Nasser Moazzami
*Assistant Examiner* — Michael S McNally
(74) *Attorney, Agent, or Firm* — Oblon, Spivak, McClelland, Maier & Neustadt, L.L.P.

(57) ABSTRACT

A microprocessor having a processor core includes an information acquisition unit that acquires information encrypted to be used by the processor core, from outside; a decryption unit that decrypts the information with a symmetric key to obtain plain text; and a controller that controls processing on the information acquired by the information acquisition unit based on the symmetric key.

19 Claims, 23 Drawing Sheets

FOREIGN PATENT DOCUMENTS

| | | |
|---|---|---|
| JP | 2002-014838 | 1/2002 |
| JP | 2002-244757 | 8/2002 |
| JP | 2002-341956 | 11/2002 |
| JP | 2003-091459 | 3/2003 |
| JP | 2003-108442 | 4/2003 |
| JP | 2003-140763 | 5/2003 |
| JP | 2003-177938 | 6/2003 |
| JP | 2003-280989 | 10/2003 |
| JP | 2004-038394 | 2/2004 |
| JP | 2004-054834 | 2/2004 |
| JP | 2004-133793 | 4/2004 |

OTHER PUBLICATIONS

U.S. Appl. No. 11/353,178, filed Feb. 14, 2006, Miyamori, et al.
U.S. Appl. No. 12/274,024, filed Nov. 19, 2008, Hashimoto, et al.
Hiroyoshi Haruki, et al., "Operating System for Multiparty Secure Processor", Summary of the 2004 Symposium on Cryptography and Information Security (SCIS2004), The Institute of Electronics, Information and Communication Engineers, Jan. 27, 2004, 7 pages.

* cited by examiner

FIG.3

| KEY ID | SYMMETRIC KEY |
|---|---|
| 1 | DEVELOPMENT KEY |
| 2 | FIRST PRODUCT KEY |
| 3 | SECOND PRODUCT KEY |
| 4 | THIRD PRODUCT KEY |

| KEY ID | PROTECTION ATTRIBUTE |
|---|---|
| PLAIN TEXT (0) | NON-PROTECTION (0) |
| DEVELOPMENT KEY (1) | NON-PROTECTION (0) |
| REST | PROTECTION (1) |

| REQUEST KIND | ATTRIBUTE | OUTPUT |
|---|---|---|
| * | NON-PROTECTION | PLAIN TEXT PROGRAM |
| INSTRUCTION FETCH EXECUTED BY PROCESSOR CORE | PROTECTION | PLAIN TEXT PROGRAM |
| REST | PROTECTION | ERROR |

FIG.12

| PROGRAM ID | PROTECTION ATTRIBUTE |
|---|---|
| 0001 | 1 |
| 0002 | 0 |
| ⋮ | ⋮ |

FIG.13

| BANK | PROTECTION ATTRIBUTE |
|---|---|
| BANK 1 | 1 |
| BANK 2 | 0 |
| ⋮ | ⋮ |

FIG.17

| PUBLIC KEY | PUBLIC KEY (kp) | SECRET KEY (ks) | |
|---|---|---|---|
| 1 | Kp1 | Ks1 | ← FOR DEVELOPMENT |
| 2 | Kp2 | Ks2 | ← FOR PRODUCT |

| TASK ID | PUBLIC KEY ID | COMMON KEY |
|---|---|---|
| ⋮ | ⋮ | ⋮ |
| 3 | 1 | KX3 |
| ⋮ | ⋮ | ⋮ |

FIG.19

| ADDRESS TAG | PROGRAM | PROTECTION ATTRIBUTE |
|---|---|---|
| X 1 | ab014af9 | 0 |
| ⋮ | ⋮ | ⋮ |

| REQUEST TYPE | PROTECTION ATTRIBUTE | OUTPUT |
|---|---|---|
| * | NON-PROTECTION | INSTRUCTION |
| INSTRUCTION FETCH EXECUTED BY PROCESSOR CORE | PROTECTION | INSTRUCTION |
| REST | PROTECTION | ERROR |

FIG.24

| PUBLIC KEY ID | PROGRAM | DATA | CONTEXT |
|---|---|---|---|
| 0 | × | × | × |
| 1 | × | ○ | × |
| 2 | ○ | × | × |
| 3 | ○ | ○ | × |
| 4 | ○ | ○ | ○ |

MICROPROCESSOR

CROSS-REFERENCE TO RELATED APPLICATIONS

This application is based upon and claims the benefit of priority from the prior Japanese Patent Applications No. 2004-186911 filed on June 24 and No. 2004-226885 filed on Aug. 3, 2004 the entire contents of which are incorporated herein by reference.

BACKGROUND OF THE INVENTION

1) Field of the Invention

The present invention relates to a microprocessor having a processor core.

2) Description of the Related Art

In recent years, a method of incorporating a debugger interface in a microprocessor, connecting the debugger interface to a debugger, thereby analyzing the state within the processor, and facilitating debugging at the time of software development is known.

By using this method, it is possible to access resources such as registers or memories in the processor from the debugger via the debugger interface incorporated in the processor. There is an advantage that, for example, step execution of a program operating in the processor can be performed.

By incorporating the debugger interface, it becomes easy for a software developer to verify the operation of the program. On the other hand, however, there is a problem that it becomes easy for other software developers and users to analyze the software.

For example, if developed software contains secret information, it is necessary to prevent software users from analyzing the software. In addition, it is also necessary to prevent other software developers from analyzing the software.

As a technique for that purpose, a method of prohibiting the debugging function based on a key selected at the time of decoding, and a method of prohibiting the operation of the debugging function when a program of protection subject stored in a memory within the processor is selected as a debugging subject are proposed (for example, see Japanese Patent Application Laid-Open No. 2002-244757).

If debugging for a predetermined program or the like is prohibited, however, debugging for that program cannot be executed at all, resulting in inconvenience. It is desired to improve the debugging function by controlling whether to enable the debugging function more suitably.

SUMMARY OF THE INVENTION

It is an object of the present invention to at least solve the problems in the conventional technology.

A microprocessor according to one aspect of the present invention includes a processor core; an information acquisition unit that acquires information encrypted to be used by the processor core, from outside; a decryption unit that decrypts the information with a symmetric key to obtain plain text; and a controller that controls processing on the information acquired by the information acquisition unit based on the symmetric key.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a diagram schematically that depicts a data configuration of a key table 133;

FIG. 4 is a diagram that depicts a protection attribute determination table 136 used by a protection attribute adder 135 when providing a protection attribute;

FIG. 8 is a diagram schematically that depicts a rule for access control executed by an instruction memory access controller 124;

FIG. 12 is a diagram schematically that depicts a data configuration of a protection attribute memory 122 according to a first modification example of a second embodiment;

FIG. 13 is a diagram schematically that depicts a data configuration of a protection attribute memory 122 according to a second modification example of a second embodiment;

FIG. 17 is a diagram schematically that depicts a data configuration of a secret key table 172;

FIG. 18 is a diagram schematically that depicts a data configuration of a common key table 139;

FIG. 19 is a diagram schematically that depicts a data configuration of an instruction cache 182;

FIG. 20 is a diagram schematically that depicts a rule for access control in an instruction cache access controller 184;

FIG. 24 is a diagram schematically that depicts a rule to be used by an encryption and decryption request generator 138 to determine whether to encrypt or decrypt;

DETAILED DESCRIPTION

Hereafter, embodiments of a microprocessor according to the present invention is explained in detail with reference to the drawings. The present invention is not restricted by the embodiments.

Figure 1:
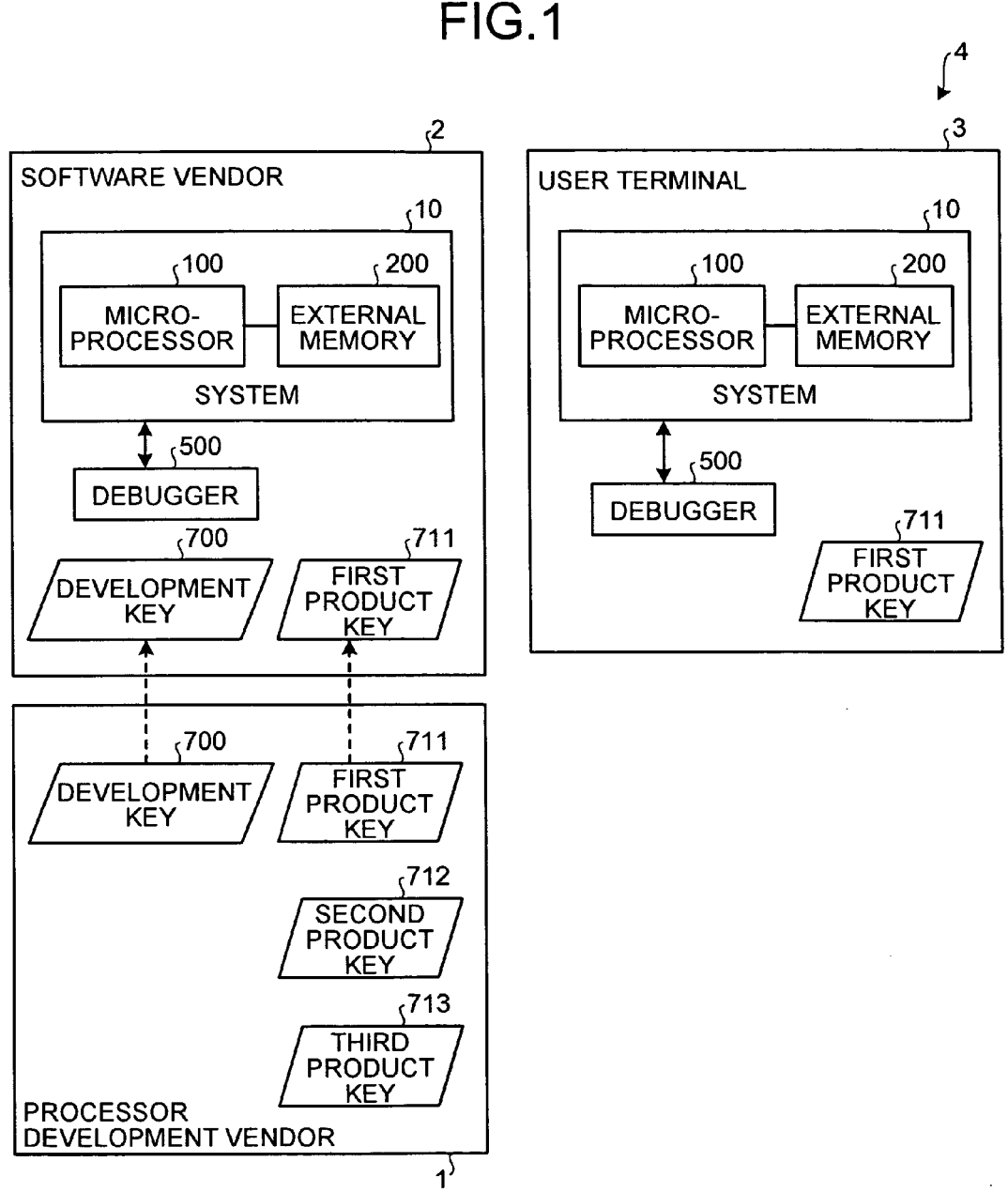
FIG. 1 is a diagram that depicts the whole of a program development system 4 according to a first embodiment.

FIG. 1 is a diagram that depicts the whole of a program development system according to a first embodiment The program development system 4 includes a processor development vendor 1, a software vendor 2, and a user terminal 3. The processor development vendor 1 sells a microprocessor 100 to the software vendor 2 and the user terminal 3.

The processor development vendor 1 prepares a development key 700, which is used by the software vendor 2 at the time of debugging, a first product key 711, a second product key 712, and a third product key. These keys are incorporated in the microprocessor 100 beforehand.

The development key is an symmetric key used by the software vendor 2 when developing a program or the like. The product keys are symmetric keys used by the software vendor 2 when providing developed software for the outside. In the present embodiment, the development key and the product keys are prepared separately and a development key encrypted program using the development key and product key encrypted programs using the product keys are obtained from the same program.

The processor development vendor 1 notifies the software vendor 2 of the development key, a predetermined product key, and key IDs associated with them. In the present embodiment, the processor development vendor 1 notifies the software vendor 2 of the development key 700, the first product key 711, and key IDs 1 and 2 associated with them.

Whether which keys are notified may be determined according to a contract concluded between the processor development vendor 1 and the software vendor 2. Specifically, the processor development vendor 1 may notify a predetermined software vendor of the first product key 711 and its associated key ID 2 and notify another software vendor of the second product key 712 and its associated key ID 3.

By thus giving a message of a product key that differs from software vendor to software vendor, it is possible to prevent software developed by a certain software vendor from being analyzed by another software vendor.

The number of the development and the product key is not restricted to the present embodiment. A plurality of development keys may be prepared. The number of the product keys may be one.

The software vendor 2 includes a system 10. The system 10 includes mainly a microprocessor 100 and an external memory 200. The software vendor 2 retains the development key 700 and the first product key 711 acquired from the processor development vendor 1.

When developing software, the software vendor 2 executes debugging on software under development by connecting a debugger 500 to the system 10. At this time, the software vendor 2 executes encryption and decryption on the software by using the development key 700 acquired from the processor development vendor 1.

When shipping the software as a product, the software vendor provides the user terminal 3 with the ID 2 associated with the first product key 711 and the program encrypted by using the first product key 711.

By setting the ID 2 provided by the software vendor 2, the user terminal 3 can execute the program encrypted by using the first product key 711. The user terminal 3 has a configuration similar to that of the software vendor 2.

Figure 2:
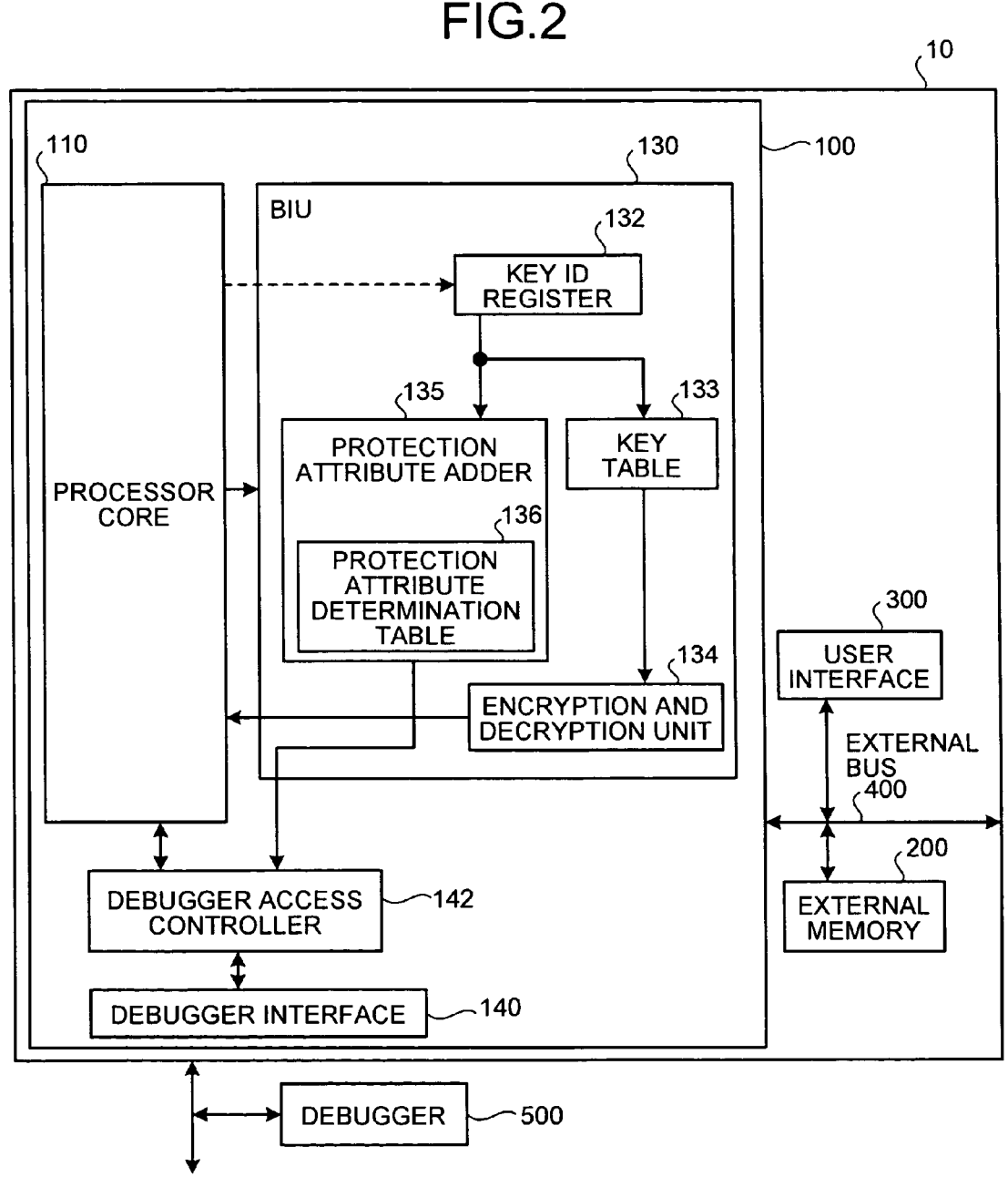
FIG. 2 is a block diagram that depicts a general configuration of a system 10 in a software vendor 2.

FIG. 2 is a block diagram that depicts a general configuration of the system 10 included in the software vendor 2. The system 10 includes a microprocessor 100, an external memory 200, a user interface 300, an external bus 400, and a debugger 500.

The microprocessor 100 includes a processor core 110, a bus interface unit (BIU) 130, a debugger interface 140 and a debugger access controller 142. The BIU 130 includes a key ID register 132, a key table 133, an encryption and decryption unit 134 and a protection attribute adder 135.

The external memory 200 retains a program that becomes an execution subject of the processor core 110. The external memory 200 retains a plain text program, a development key encrypted program or a first product key encrypted program.

The plain text program is a program that is not encrypted. The development key encrypted program is a program encrypted by using the development key 700. The first product key encrypted program is a program encrypted by using the first product key 711.

The BIU 130 acquires the plain text program, the development key encrypted program or the first product key encrypted program from the external memory 200 via the external bus 400. If the BIU 130 acquires an encrypted program, the BIU 130 decrypts the encrypted program and sends the decrypted program to the processor core 110 as a plain text program. If the BIU 130 acquires the plain text program, the BIU 130 sends it to the processor core 110 as it is. The processor core 110 executes the plain text program acquired from the BIU 130. The debugger interface 140 is connected to the debugger 500 on the outside. The debugger access controller 142 controls access from the debugger 500.

The BIU 130 includes a key ID register 132, a key table 133, an encryption and decryption unit 134 and a protection attribute adder 135.

A key ID identifying an symmetric key to be used when decrypting a program read out from the external memory 200 is set in the key ID register 132. A value of the key ID is set by the user via the user interface 300. If the program read out from the external memory 200 is the plain text program, which is not encrypted, "0" is set in the key ID register 132.

The user interface 300 according to the present embodiment corresponds to an symmetric key specification unit in claims.

The key table 133 retains a key ID and an symmetric key in association. FIG. 3 schematically depicts a data configuration of the key table 133. The key table 133 retains a key ID identifying an symmetric key to be used in encryption and decryption, and an symmetric key in association. The key table 133 in the present embodiment retains the development key 700, the first product key 711, the second product key 712 and the third product key 713. The development key 700 is associated with a key ID "1." An symmetric key associated with the key ID set in the key ID register 132 can be determined by utilizing the key table 133.

The key table 133 according to the present embodiment corresponds to an symmetric key storage unit and a key type table in claims.

A key ID retained in the key table 133 is a value other than "0." Therefore, it can be determined whether a subject program is a plain text program based on whether the value set in the key ID register 132 is "0".

If a value other than "0" is set in the key ID register 132, the program acquired from the external memory 200 is the encrypted program and consequently the encryption and decryption unit 134 determines the symmetric key associated with the key ID set in the key ID register 132 by using the key table 133. The encryption and decryption unit 134 decrypts the encrypted program by using the determined symmetric key and obtains a plain text program. If the key ID register 132 has "0" set therein, the subject program is a plain text program and consequently the encryption and decryption unit 134 does not conduct decryption.

The protection attribute adder 135 adds a protection attribute of the program acquired from the external memory 200. FIG. 4 depicts a protection attribute determination table 136 used when the protection attribute adder 135 adds a protection attribute.

If the key ID register 132 has "0" set therein, the protection attribute adder 135 adds a corresponding program with a protection attribute "0," which indicates non-protection, as shown in FIG. 4. If the key ID register 132 has "1" set therein, the protection attribute adder 135 adds a corresponding plain text program with a protection attribute "0," which indicates non-protection, in the same way. If the key ID register 132 has a value that is neither "0" nor "1" set therein, the protection attribute adder 135 adds a corresponding plain text program with a protection attribute "1," which indicates protection.

In other words, the protection attribute adder 135 adds to a product key encrypted program a protection attribute that indicates protection, and provides a plain text program, which is not encrypted, and a development key decrypted program with a protection attribute that indicates non-protection. In this way, the protection attribute adder 135 can add only to a product key decrypted program a protection attribute that indicates protection.

The debugger access controller 142 controls access from the debugger interface 140 to a program based on the protection attribute. Specifically, the debugger access controller 142 prohibits access to information concerning a program added with a protection attribute that indicates protection.

The software vendor 2 according to the present embodiment can retain the same program as a development key encrypted program and a product key encrypted program. The development key encrypted program and the product key encrypted program are added with protection attributes indicating non-protection and protection, respectively. In other words, the debugger access controller 142 can prohibit only access to a product key encrypted program, while permitting access to a development key encrypted program. As a result, the debugger 500 can conduct debugging on only a plain text or a program encrypted by using the development key.

Figure 5:
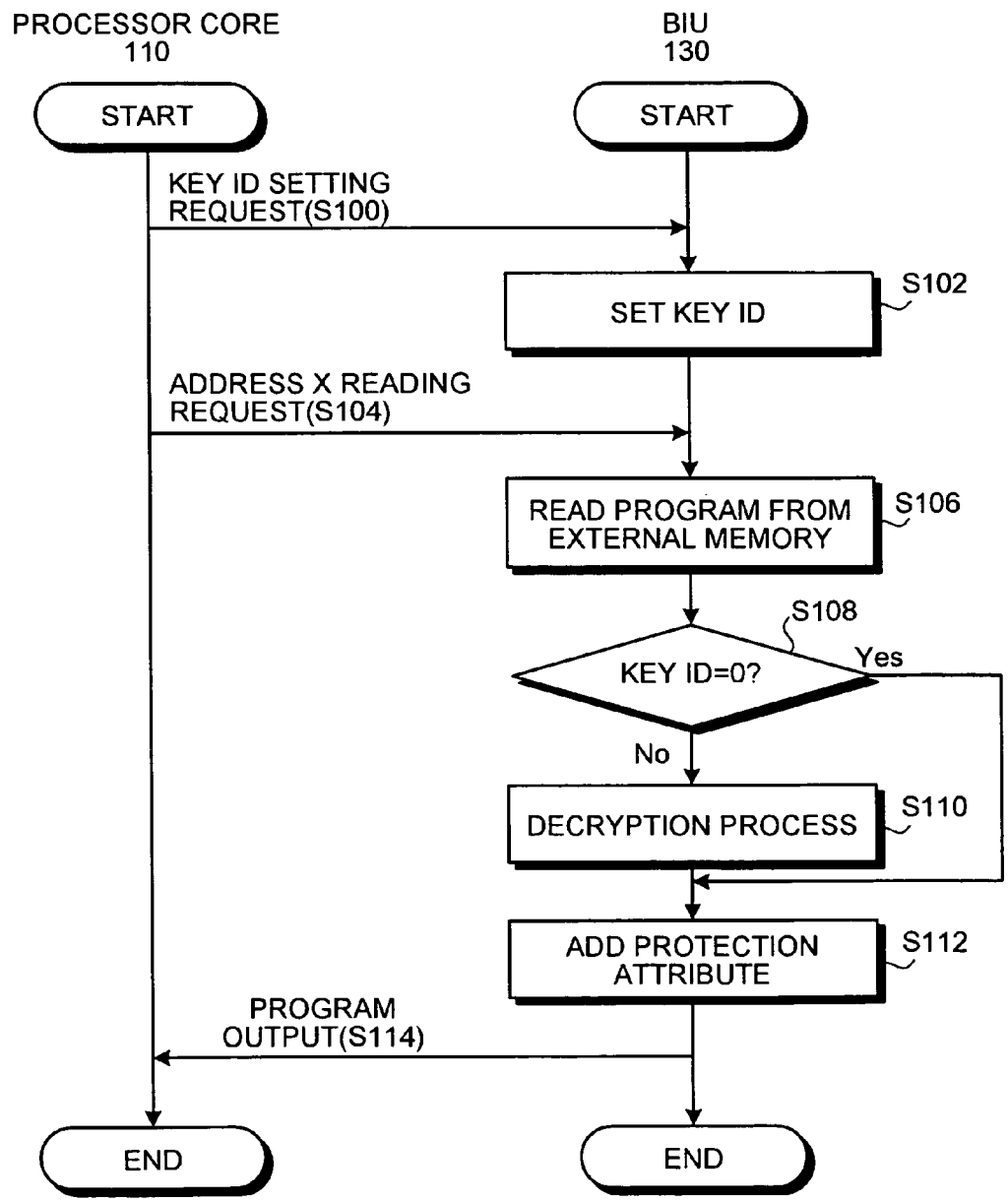
FIG. 5 is a flow chart that depicts reading processing executed when a software vendor 2 reads a program that is being developed from an external memory 200 into a microprocessor 100.

FIG. 5 is a flow chart that depicts reading processing executed when the software vendor 2 reads a program that is being developed from the external memory 200 into the microprocessor 100. First, the user stores a program to be executed by the processor core 110 into the external memory 200. Prior to program execution, the user sets a key ID in the key ID register 132 in the BIU 130 (steps S100 and S102). Here, the symmetric key setting is executed under an order issued by the user via the user interface 300.

The processor core 110 sends a reading request for data in address X to the BIU 130 by using an instruction fetch (step S104).

The BIU 130 reads out a program E2[C(X)] associated with the address X from the external memory 200 (step S106). If at this time the key ID register 132 has a value other than "0" set therein (No at step S108), the encryption and decryption unit 134 executes decryption processing on the encrypted program E2[C(X)] read out by using the symmetric key obtained from the key table 133, and obtains a plain text program C(X) (step S10). In this way, if the key ID register 132 has a value other than "0" set therein, the subject program is in an encrypted form and consequently a plain text program is obtained by decryption.

On the other hand, if the key ID register 132 has a value "0" set therein (Yes at the step S108), the decryption processing is not executed and the processing proceeds to step S112 explained later. In this way, if the key ID register 132 has a value "0" set therein, the subject program is a plain text program and consequently it is not necessary to conduct decryption.

On the other hand, the protection attribute adder 135 adds to a plain text program to be retained in an internal memory 120 a protection attribute based on the value in the key ID register 132 (step S112).

Specifically, if the key ID register 132 has a value "0" set therein, namely, if the subject is a plain text program, the protection attribute adder 135 adds to the plain text program the protection attribute "0," which indicates non-protection. If the key ID register 132 has a value "1" set therein, namely, if the subject is a program obtained as a development key encrypted program, the protection attribute adder 135 adds the program with the protection attribute "0," which indicates non-protection, in the same way. If the key ID register 132 has a value that is neither "0" nor "1" set therein, namely, if the subject is a product key encrypted program, the protection attribute adder 135 adds the program with the protection attribute "1," which indicates protection.

The encryption and decryption unit 134 sends the plain text program to the processor core 110 (step S114). Owing to the processor explained heretofore, the processor core 110 is brought into a state in which a program can be executed.

Specifically, when developing a product using the debugging function, the software vendor first stores a development key encrypted program encrypted by using the development key 700 dedicated to debugging. On the other hand, at the time of other than the product development, such as program shipping, the software vendor stores a product key encrypted program encrypted by using the first product key 711.

For a development key encrypted program, the user sets the key ID "1" in the key ID register 132 (step S102). Therefore, the encryption and decryption unit 134 decrypts the development key encrypted program and obtains a plain text program (No at the step S108, and the step S110). The protection attribute adder 135 adds the plain text program with a protection attribute that indicates non-protection (step S112).

For a first product key encrypted program, the user sets the key ID "2" in the key ID register 132 (step S102). Therefore, the encryption and decryption unit 134 decrypts the first product key encrypted program and obtains a plain text program (No at the step S108, and the step S110). The protection attribute adder 135 adds the plain text program with a protection attribute that indicates protection (step S112).

Figure 6:
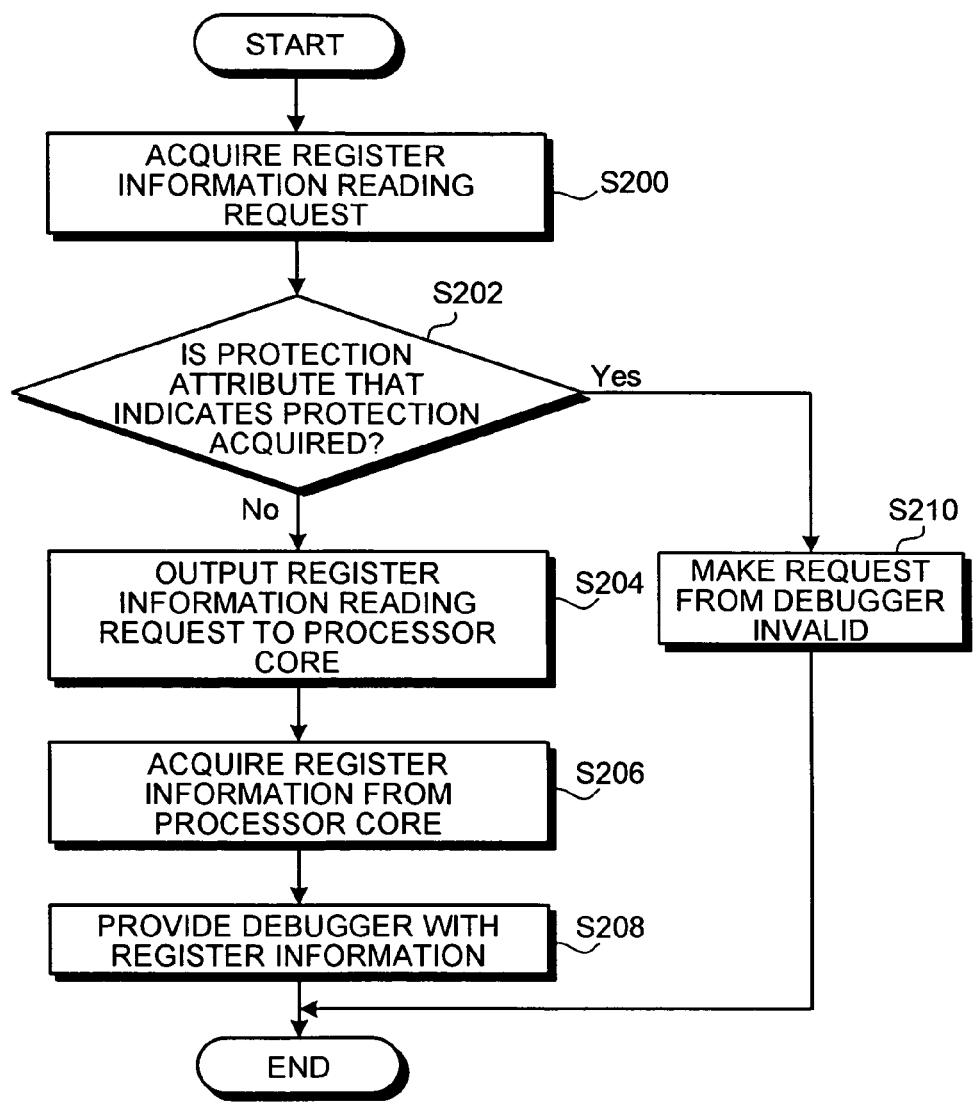
FIG. 6 is a flow chart that depicts reading processing executed when a debugger 500 reads a plain text program sent to a processor core 110 by processing explained with reference to FIG. 5.

FIG. 6 is a flow chart that depicts reading processing executed when the debugger 500 reads a plain text program sent to the processor core 110 by processing explained with reference to FIG. 5.

The debugger 500 sends a reading request for register information retained in the processor core 110 to the debugger access controller 142 via the debugger interface 140. Upon acquiring the reading request from the debugger 500 via the debugger interface 140 (step S200), the debugger access controller 142 acquires a protection attribute of a program corresponding to the reading request from the protection attribute adder 135.

If the program does not have a protection attribute that indicates non-protection added to it (No at step S202), the debugger access controller 142 outputs a register information reading request to the processor core 110 (step S204). The debugger access controller 142 acquires register information from the processor core 110 as a reply for the reading request (step S206). The debugger access controller 142 adds the debugger 500 with a program acquired from the processor core 110 via the debugger interface 140 (step S208).

On the other hand, if the program concerning the reading request has a protection attribute that indicates protection added to it (Yes at the step S202), the debugger access controller 142 invalidates the request from the debugger 500 (step S210). The reading processing is thus completed.

As another example, the debugger access controller 142 may output an error signal to the debugger 500 instead of invalidating the request from the debugger 500.

As another example, the debugger access, controller 142 may encrypt a program, and then add it. Specifically, since the development key encrypted program has the protection attribute that indicates non-protection added to it (No at the step S202), the debugger access controller 142 permits read-out of register information, and outputs a register value of a plain text to the debugger 500 (steps S204 to S210). On the other hand, since the first product key encrypted program has the protection attribute that indicates protection added to it (Yes at the step S202), the debugger access controller 142 reads out register information, encrypts the register information by using the first product key, and outputs the encrypted register information to the debugger 500.

In this way, the debugger access controller 142 prohibits register information used by the program added with the protection attribute that indicates protection from being read out in the debugger 500. Therefore, it is possible to prevent a third person from analyzing a plain text program illegally by using the debugger 500. It should be noted that the third person indicates another user or another software developer who is different from the developer developing the protected software.

The development key encrypted program encrypted by using the development key is a program prepared supposing that it is analyzed by the debugger 500. The development key encrypted program has a protection attribute that indicates non-protection added to it. The debugger 500 can acquire the development key encrypted program.

The first product key encrypted program for a program is prohibited from being analyzed by the debugger 500. On the other hand, the debugger 500 is permitted to analyze the development key encrypted program for the same program. As a result, it is possible to prevent a third person from analyzing the program illegally by using the debugger 500, without restraining the debugger 500 from analyzing the program.

Frequently, the software vendor 2 encrypts and then ships the programs developed by the vendor. At the time of program development as well, therefore, it is desirable to handle an encrypted program as the subject Because this makes it possible to conduct development with due regard to a delay in the decryption processing.

The software vendor 2 according to the embodiment of the present invention develops software using the first product key encrypted program. Therefore, this makes it possible to conduct development with due regard to a delay in the decryption processing.

Processing executed in the user terminal 3 is explained. The processing executed in the user terminal 3 is similar to the processing executed in the software vendor 2 and explained with reference to FIGS. 5 and 6.

Hereafter, reading processing of reading a program acquired from the software vendor 2 into the microprocessor 100 executed by the user terminal 3 is explained concretely.

First, the user terminal 3 acquires a program developed in the software vendor 2 from the software vendor 2 as the first product key encrypted program encrypted by using the first product key 711, and stores the first product key encrypted program in the external memory 200.

Prior to execution of the first product key encrypted program, the user terminal 3 sets a key ID in the key ID register 132 in the BIU 130 (steps S100 and S102). The program acquired from the software vendor 2 is the first product key encrypted program encrypted by using the first product key 711. Therefore, the encryption and decryption unit 134 decrypts the first product key encrypted program and obtains a plain text program (No at the step 108, and the step S10). At the step S112, the protection attribute adder 135 adds the plain text program with the protection attribute that indicates protection.

Other processing executed when the user terminal 3 acquires the program is similar to that executed in the software vendor 2 and explained with reference to FIG. 5.

Reading processing executed by the debugger 500 in the user terminal 3 reads out register information of a program under execution is explained with reference to FIG. 6.

Upon acquiring a reading request from the debugger 500 via the debugger interface 140 (step S200), the debugger access controller 142 acquires a protection attribute of a program corresponding to the reading request from the protection attribute adder 135. The program corresponding to the reading request is the first product key encrypted program and has the protection attribute that indicates protection added to it (Yes at the step S202). Therefore, the processing proceeds to step S210. In other words, the request from the debugger 500 is invalidated.

In this way, the user terminal 3 is provided with the first product key encrypted program encrypted by using the first product key 711. Therefore, it is possible to prevent a program from being analyzed illegally by using the debugger 500 in the user terminal 3.

The present invention has been explained with reference to an embodiment. Various changes or improvement can be applied to the embodiment.

In the first embodiment, the development key 700 and the first product key 711 retained by the software vendor 2 and the user terminal 3 are issued by the processor development vendor 1. In a first modification example, the value of the development key 700 may be changed by the software vendor 2 and the user of the user terminal 3. At this time, the user sets an arbitrary development key via the user interface 300. At this time, a key table for the development key and key tables for product keys may be provided separately.

The user interface 300 according to the present modification example corresponds to a development key generator in claims.

Even if the delay caused when decrypting an encrypted program differs based on the value of the symmetric key, therefore, the developer can set the value of the symmetric key freely. As a result, it is possible to conduct the analysis of the bug caused by the delay more accurately.

The developer can set the same key value as that of the product key. By thus setting the same value as that of the product key, software development can be executed under the same condition as that at the time of shipping a program as a product.

Even if the same key value as that of the product key is set, a problem on the security is not caused by setting the same key value, by preventing the product key within the processor retained by the user 3 from becoming the same key.

In the first embodiment, the protection attribute adder 135 adds a program with "0" or "1" as the protection attribute. Processing for that purpose is not restricted to this as long as the protection attribute of the program can be determined. In a second modified example, for example, the value set in the key ID register 132 may be used as the protection attribute. At this time, the debugger access controller 142 executes processing of identifying the protection attribute based on the value of the key ID. As another example, the value of the symmetric key may be used as the protection attribute.

In the first embodiment the debugger access controller 142 is provided separately from and independently of the processor core 110. In a third modification example, however, the debugger access controller 142 may be provided in the processor core 110.

Figure 7:
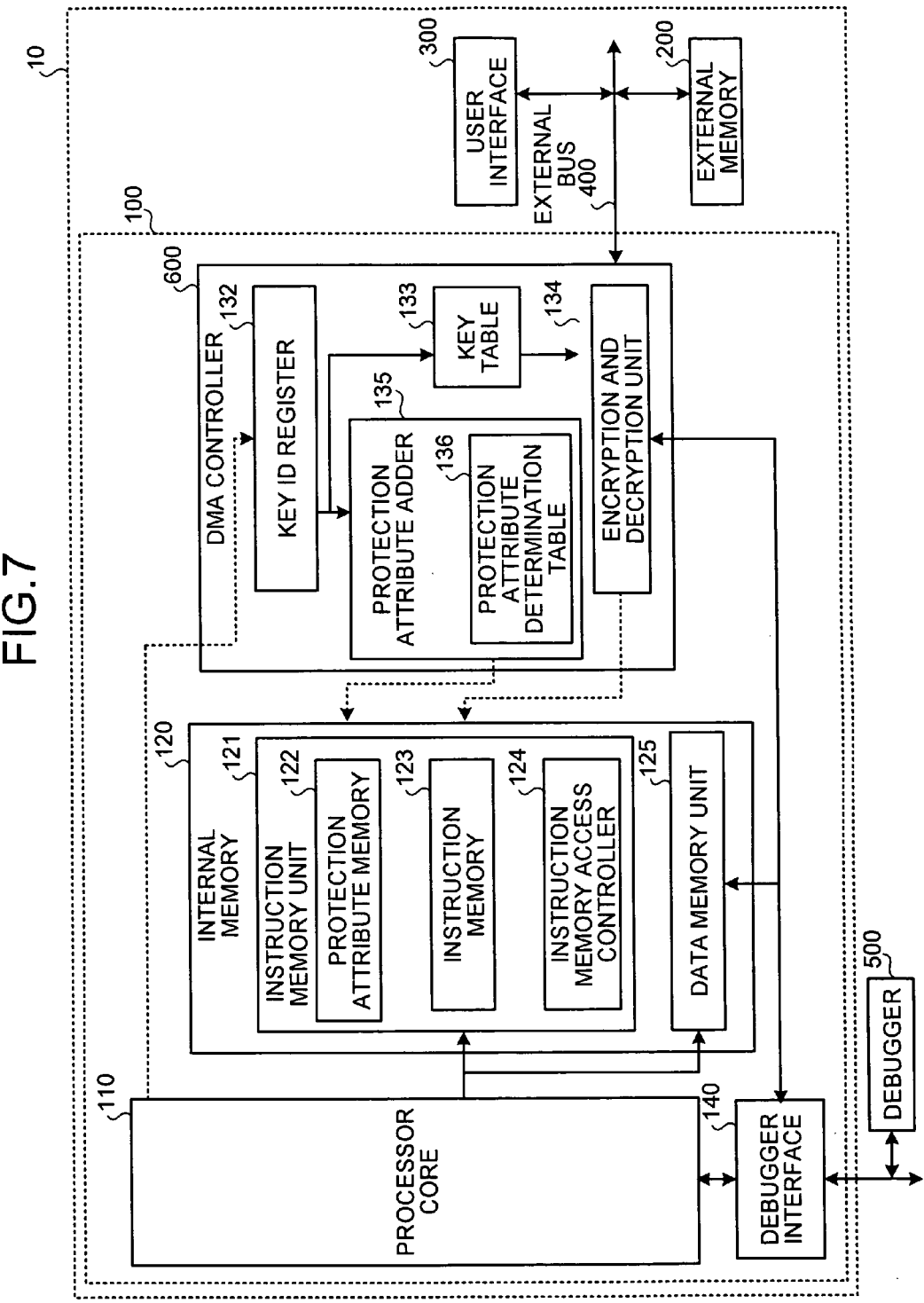
FIG. 7 is a diagram that depicts a system 10 in a software vendor 2 according to a second embodiment.

FIG. 7 depicts a system 10 in the software vendor according to a second embodiment. The system 10 in the software vendor 2 according to the second embodiment includes a DMA controller 600, an internal memory 120, a processor core 110 and a debugger interface 140.

The debugger interface 140 is connected to a debugger 500 on the outside. In response to requests from the debugger, the debugger interface 140 distributes the requests among the processor core 110, the internal memory 120 and the DMA controller 600. Upon receiving execution results associated with the requests, the debugger interface returns the execution results to the debugger 500.

The DMA controller 600 includes a key ID register 132, a key table 133, an encryption and decryption unit 134, and a protection attribute adder 135. Each of the units in the DMA controller 600 has a functional configuration similar to that in the BIU 130 according to the first embodiment. In other words, the key table 133 in the DMA controller 600 retains the development key 700, the first product key 711, the second product key 712 and the third product key 713.

The encryption and decryption unit 134 makes the internal memory 120 retain a decrypted plain text program. The processor core 110 reads out and executes the plain text program retained in internal memory 120.

The internal memory 120 includes an instruction memory unit 121, which retains a program, and a data memory unit 125, which retains data. The instruction memory unit 121 includes a protection attribute memory 122, an instruction memory 123 and an instruction memory access controller 124.

The instruction memory 123 retains the plain text program acquired from the encryption and decryption unit 134. The protection attribute memory 122 retains a protection attribute added to the plain text program retained in the instruction memory 123. The instruction memory access controller 124 controls access from the outside to the instruction memory 123.

FIG. 8 schematically depicts a rule for access control in the instruction memory access controller 124. If the request type is an instruction fetch executed by the processor core 110 and a requested program has a protection attribute that indicates protection added to it, access is permitted as shown in FIG. 8. If the request type is an access request other than an instruction fetch executed by the processor core 110 and a requested program has a protection attribute that indicates protection added to it, access is restricted. In other words, an error signal is output. If the requested program has a protection attribute that indicates non-protection added to it, access is restricted irrespective of the request type.

Thus, it is possible to prevent a third person from reading out a plain text program illegally, by restricting access from a request type other than a specific request type.

It is possible to prevent a program encrypted by using a product key from being read out illegally, by restricting access to a program added with a protection attribute that indicates protection.

Figure 9:
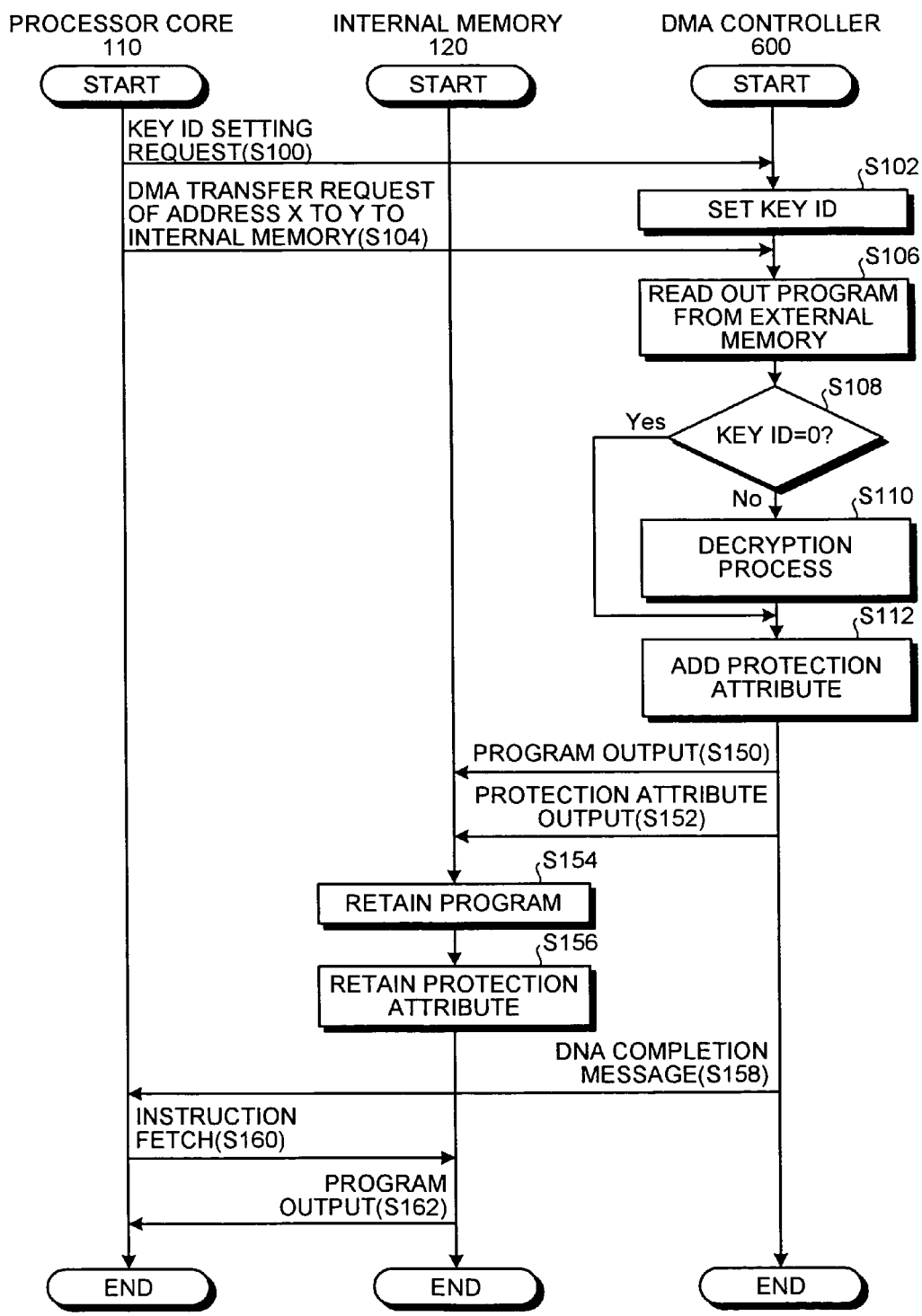
FIG. 9 is a flow chart that depicts processing executed when a software vendor 2 acquires a program that is being developed from an external memory 200.

FIG. 9 is a flow chart that depicts processing executed when the software vendor 2 acquires a program under development from the external memory 200. First, the user stores a program to be executed by the processor core 110 in the external memory 200. It is now supposed that the program is stored in addresses X to Y on the external memory 200.

Prior to execution of the program, a key ID is set in the key ID register 132 in the DMA controller 600 (steps S100 and S102). Setting of the symmetric key is executed based on an order given by the user via the user interface 300.

The processor core 110 sends a DMA transfer request to the DMA controller 600 (step S104). The DMA transfer request is information that requests transfer of data in the address X to Y on the external memory 200 to the internal memory.

The DMA controller 600 reads out a program E2[C(X~Y)] associated with the address X~Y from the external memory 200 (step S106). Hereafter, processing executed at steps S108 to S112 is similar to that executed at steps S108 to S112 in the software vendor 2 according to the first embodiment.

Upon being added with a protection attribute at the step S112, the encryption and decryption unit 134 sends a plain text program to the internal memory 120 (step S150). In addition, the protection attribute adder 135 sends the protection attribute added to the plain text program to the internal memory 120 (step S152).

The internal memory 120 causes the instruction memory 123 to retain a plain text program C(X~Y), which is a decryption result sent from the DMA controller 600 (step S154). The internal memory 120 causes the protection attribute memory 122 to retain the protection attribute (step S156).

If the transfer of the plain text program from the DMA controller 600 to the internal memory 120 is completed, the DMA controller 600 notifies the processor core 110 that the DMA transfer is completed (step S158). As a result of the processing heretofore explained, the program is retained in the internal memory 120, and the processor core 110 is brought into a state in which it can execute the program.

The processor core 110 requests program readout by using instruction fetch (step S160). Upon acquiring the reading request, the internal memory 120 outputs the requested program to the processor core 110 (step S162).

If the subject is a development key encrypted program, the software vendor sets the key ID "1" in the key ID register 132 (step S102). Therefore, the encryption and decryption unit 134 executes decryption processing and obtains a plain text program (No at the step S108 and step S110). The protection attribute adder 135 adds the plain text program with a protection attribute that indicates non-protection (step S112).

On the other hand, if the subject is a first product key encrypted program, the software vendor sets the key ID "2" in the key ID register 132 (step S102). At this time as well, the encryption and decryption unit 134 executes decryption processing and obtains a plain text program (No at the step S108 and step S110). The protection attribute adder 135 adds the plain text program with a protection attribute that indicates protection (step S112).

Figure 10:
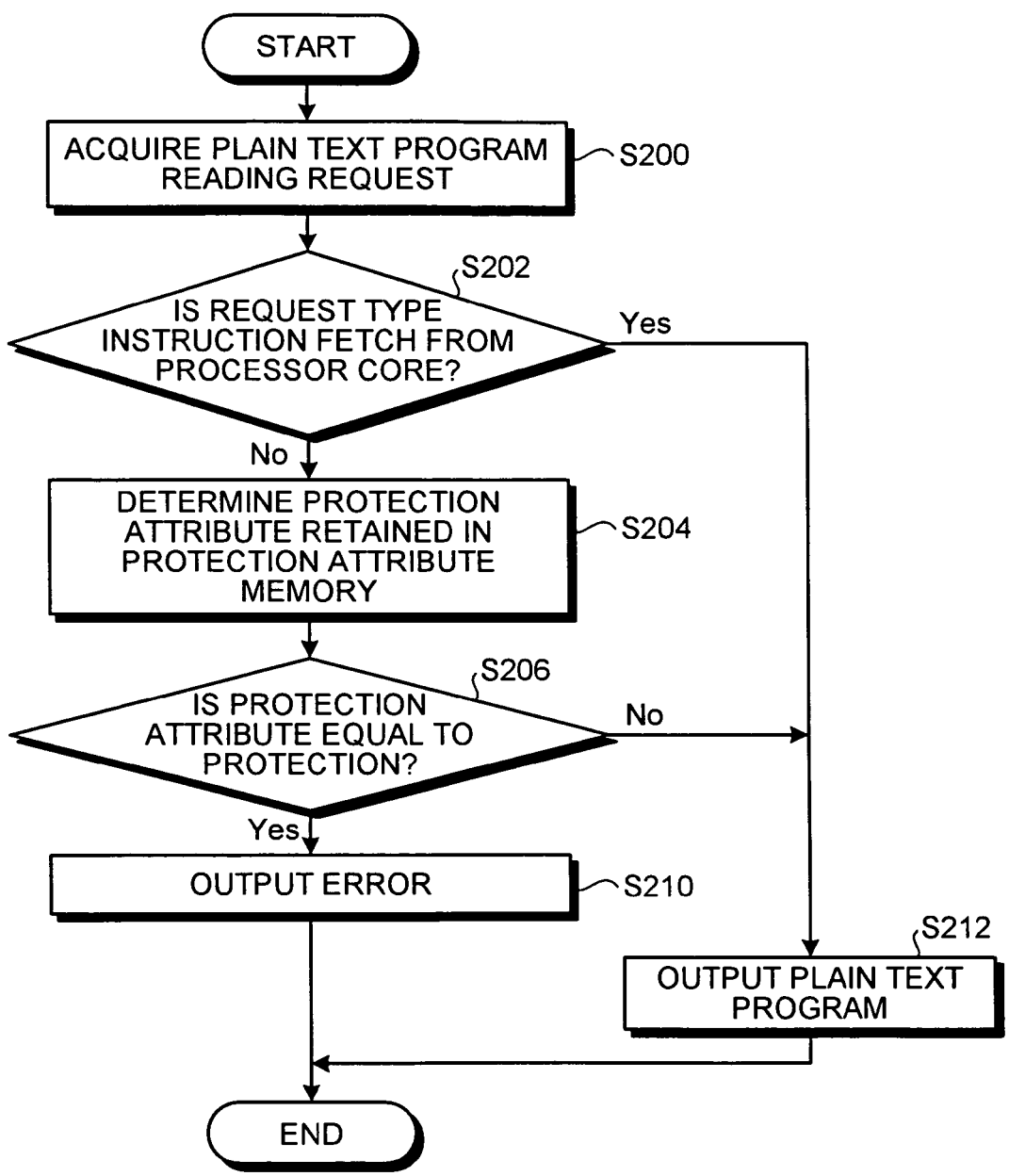
FIG. 10 is a flow chart that depicts reading processing executed when reading a program retained in an internal memory 120 by processing explained with reference to FIG. 5.

FIG. 10 is a flow chart that depicts reading processing executed when reading out a program retained in the internal memory 120 by executing processing explained with reference to FIG. 8. Upon acquiring a reading request that indicates readout of a program retained in the instruction memory 123 (step S200), the instruction memory access controller 124 in the internal memory 120 determines whether the request type for the reading request output is instruction fetch executed by the processor core 110. Specifically, the request type may be determined based on, for example, physical wiring. If the request type is instruction fetch executed by the processor core 110 (Yes at step S202), the instruction memory access controller 124 outputs a plain text program retained in the instruction memory 123 to the processor core 110 (step S212).

If the request type is not instruction fetch executed by the processor core 110 (No at step S202), the encryption and decryption unit 134 determines the protection attribute of the requested plain text program (step S204). If the requested plain text program has a protection attribute that indicates protection added to it (Yes at step S206), an error signal is output (step S210). On the other hand, if the requested plain text program has a protection attribute that indicates non-protection added to it (No at the step S206), the plain text program is output (step S212). The reading processing is thus completed.

Operation executed when the processor core 110 has issued a reading request for the internal memory 120 by using instruction fetch is explained concretely. If the instruction memory access controller 124 in the internal memory 120 judges the request to be an instruction fetch request from the core, the instruction memory access controller 124 sends a plain text program C(X~Y) read out from the instruction memory 123 to the processor core 110 based on the rule explained with reference to FIG. 8 (Yes at the step S202 and the step S212). The processor core 110 executes the acquired plain text program.

If the request type is not instruction fetch executed by the processor core 110 (No at the step S202) and the protection attribute is "0," which indicates non-protection (No at the step S206), a plain text program is output (step S212).

If the request type is not instruction fetch executed by the processor core 110 (No at the step S202) and the protection attribute is "1," which indicates protection (Yes at the step S206), an error signal is output (step S210).

If the subject is a development key encrypted program, it has a protection attribute that indicates non-protection added to it (No at the step S202) and consequently the instruction memory access controller 124 permits access to a plain text program obtained by decrypting the development key encrypted program (steps S204 to S208).

On the other hand, if the subject is a first product key encrypted program, it has a protection attribute that indicates protection added to it (Yes at the step S202) and consequently the instruction memory access controller 124 invalidates the request (step S210).

Thus, for a request type other than the instruction fetch executed by the processor core 110, the instruction memory access controller 124 in the internal memory 120 can prohibit a plain text program added with a protection attribute that indicates protection from being read out. In other words, it can be prohibited to read out a product key encrypted program.

On the other hand, a development key encrypted program has a protection attribute that indicates non-protection added to it, and consequently the debugger 500 can acquire the development key encrypted program. Therefore, program development can be executed by using the development key encrypted program.

Thus, by preparing product key encrypted programs and a development key encrypted program, it is possible to prevent a third person from reading out a program illegally without restricting the program development.

As one of methods of analyzing the software by using the debugger 500, a method of executing a reading request for a plain text program retained in the internal memory 120 from the debugger 500 via the debugger interface 140 is conceivable.

At this time, however, the request type is not instruction fetch executed by the processor core. Based on the reading processing explained with reference to FIG. 10, it is restrained from reading a plain text program added with a protection attribute that indicates protection. In other words, the instruction memory access controller 124 outputs an error signal to the debugger interface 140. Therefore, a plain text program can be prevented from being read out via the debugger 500.

As another method, a method of reading out a plain text program illegally via the DMA controller 600 executed by a third person is conceivable. For example, it can be implemented by the debugger 500 issuing a DMA transfer request to the DMA controller 600. This DMA transfer request requests that a program retained in the internal memory 120 should be transferred from a region in the internal memory 120 to a suitable region in the external memory 200.

At this time, the DMA controller 600 issues a transfer request to the internal memory 120 in response to the DMA transfer request from the debugger 500. Specifically, the DMA controller 600 requests transfer from the instruction memory 123 in the internal memory 120 to the external memory 200.

At this time, however, the request type is not instruction fetch executed by the processor core 110. Based on the reading processing explained with reference to FIG. 10, therefore, it is restricted to read out a program added with a protection attribute that indicates protection. In other words, an error signal is output.

In this way, the debugger 500 can access not only via the debugger interface 140 but also via the DMA controller 600. Even at this time, however, a program can be prevented from being read out illegally by a third person.

Figure 11:
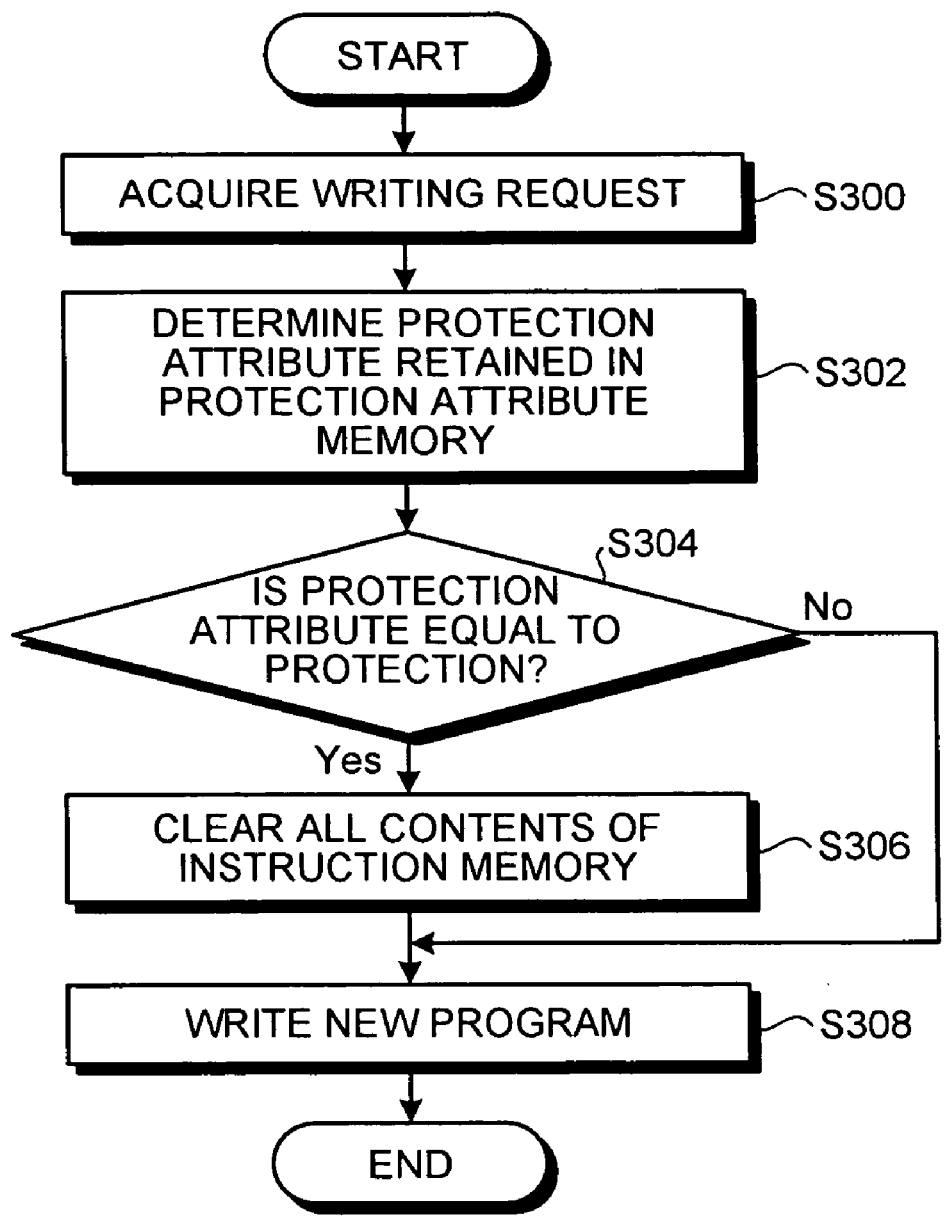
FIG. 11 is a flow chart that depicts writing processing executed when ordered to write a new plain text program in a state in which a plain text program is already retained in an instruction memory 123, namely, when overwriting is ordered.

FIG. 11 is a flow chart that depicts writing processing executed when ordered to write a new plain text program in a state in which a plain text program is already retained in the instruction memory 123, namely, when overwriting is ordered.

Upon acquiring a writing request (step S300), the internal memory 120 determines the protection attribute added to the plain text program already retained (step S302). If the plain text program has the protection attribute "1," which indicates protection, added to it (Yes at step S304), the internal memory 120 clears all contents of the instruction memory 123 in which the program is already retained (step S306). The internal memory 120 writes a program indicated by the writing request into the instruction memory 123 (step S308).

On the other hand, if the plain text program has the protection attribute "0," which indicates non-protection, added to it (No at step S304), the processing proceeds to step S308. In other words, a new plain text program is written into the instruction memory 123 without clearing the contents of the instruction memory 123 (step S308). The writing processing is thus completed. The writing processing executed at the step S308 is similar to that executed when a program is acquired and explained with reference to FIG. 9.

If the internal memory 120 already stores the program with a protection attribute that indicates protection, and if overwriting of the program is permitted, it becomes possible to access a region where the program is already stored and consequently it is possible to read the program already retained. It is conceivable that a third person reads out a plain text program illegally by using this fact.

If a program added with a protection attribute that indicates protection is already retained, however, all programs already retained in the instruction memory 123 are cleared before the processing of writing a program into the instruction memory 123 is started, and then a new plain text program is written as explained with reference to FIG. 11. Therefore, it is possible to prevent the already retained program from being read out illegally. Since each product key encrypted program has a protection attribute that indicates protection added to it, it is possible to prevent the product key encrypted program from being read out illegally.

The rest configuration and processing in the software vendor 2 are similar to those in the software vendor 2 according to the first embodiment. The configuration and processing in the user terminal 3 according to the second embodiment are similar to those in the software vendor 2 according to the second embodiment.

Processing executed in the user terminal 3 when the debugger 500 reads out a program is explained with reference to FIG. 10. The debugger interface 140 acquires a reading request from the debugger 500 (step S200). The instruction memory access controller 124 determines the protection attribute of the program. The program retained in the instruction memory 123 in the user terminal 3 is the first product key encrypted program. The program has the protection attribute that indicates protection added to it. Irrespective of the request type, therefore, the processing proceeds to the step S210 and an error signal is output.

The present invention has been explained with reference to the embodiment Various changes or improvement can be applied to the embodiment.

In the first modification example, it is also possible that the instruction memory 123 retains a plurality of plain text programs and access is restricted by taking a plain text program as the unit. FIG. 12 schematically depicts a data configuration of the protection attribute memory 122 at this time. As shown in FIG. 12, the protection attribute memory 122 retains program IDs identifying plain text programs and protection attributes in association. Each of the program IDs is an identifier that indicates an address range in which a certain plain text program is stored. As a result, access can be restricted by taking a program as the unit.

In the first modification example, the instruction memory access controller 124 restricts access to the instruction memory 123 based on the association relation in the protection attribute memory 122, by taking a region in which each plain text program is retained as the unit.

For example, it is supposed that a reading request for a region associated with a program ID "0001" is acquired. As shown in FIG. 12, a plain text program identified by a program ID "0001" is added with a protection attribute that indicates protection. Therefore, the instruction memory 123 restricts access to the plain text program identified by the program ID "0001." On the other hand, access to a protected program identified by a program ID "0002" is permitted.

Specifically, if a reading request with the program ID "0001" is acquired, it is determined whether a plain text program is output or an error signal is output according to the reading processing shown in FIG. 10 because the plain text program identified by the program ID "0001" has the protection attribute that indicates protection added to it.

On the other hand, if a reading request with the program ID "0002" is acquired, an error signal is output according to the reading processing shown in FIG. 10 because the plain text program identified by the program ID "0002" has the protection attribute that indicates non-protection added to it.

If a writing request with the program ID "0001" is acquired, an already retained plain text program is cleared before a new program is written into a region in which the plain text program is already retained, according to the writing processing shown in FIG. 11 because the plain text program identified by the program ID "0001" has the protection attribute that indicates protection added to it.

On the other hand, if a writing request with the program ID "0002" is acquired, a new program is written into a region in which a plain text program is already retained without clearing the already retained plain text program, according to the writing processing shown in FIG. 11 because the plain text program identified by the program ID "0002" has the protection attribute that indicates non-protection added to it.

Thus, even if a plain text program added with a protection attribute that indicates protection and a plain text program added with a protection attribute that indicates non-protection are retained at the same time, only access to the plain text program added with the protection attribute that indicates protection can be restricted. Therefore, it is possible to prevent a predetermined plain text program from being read out illegally by a third person.

In the first modification example, the protection attribute memory 122 retains program IDs and the protection attributes in association. Instead, as a second modification example, the protection attribute memory 122 may retain bank locations in the instruction memory 123 and the protection attributes in association.

FIG. 13 schematically depicts a data configuration of the protection attribute memory 122 in the second modification example. As shown in FIG. 13, the protection attribute memory 122 retains bank locations in the instruction memory 123 and protection attributes added to plain text programs retained in respective bank locations in association. In the second modification example, the instruction memory access controller 124 controls access to the instruction memory 123 by taking a region in which each program is retained as the unit, based on association relations between bank locations and protection attributes.

For example, if a bank 1 is associated with the protection attribute that indicates protection and a plain text program identified by a program ID "0001" is retained in the bank 1, access to the plain text program identified by the ID "0001" is restricted. If a plain text program identfied by a program ID "0002" is retained in a bank 2, access to the plain text program identified by the program ID "0002" is permitted.

Thus, even if the instruction memory 123 retains a plurality of programs at the same time, it is possible to prevent a third person from reading out a plain text program illegally by taking a bank as the unit according to the second modification example.

Figure 14:
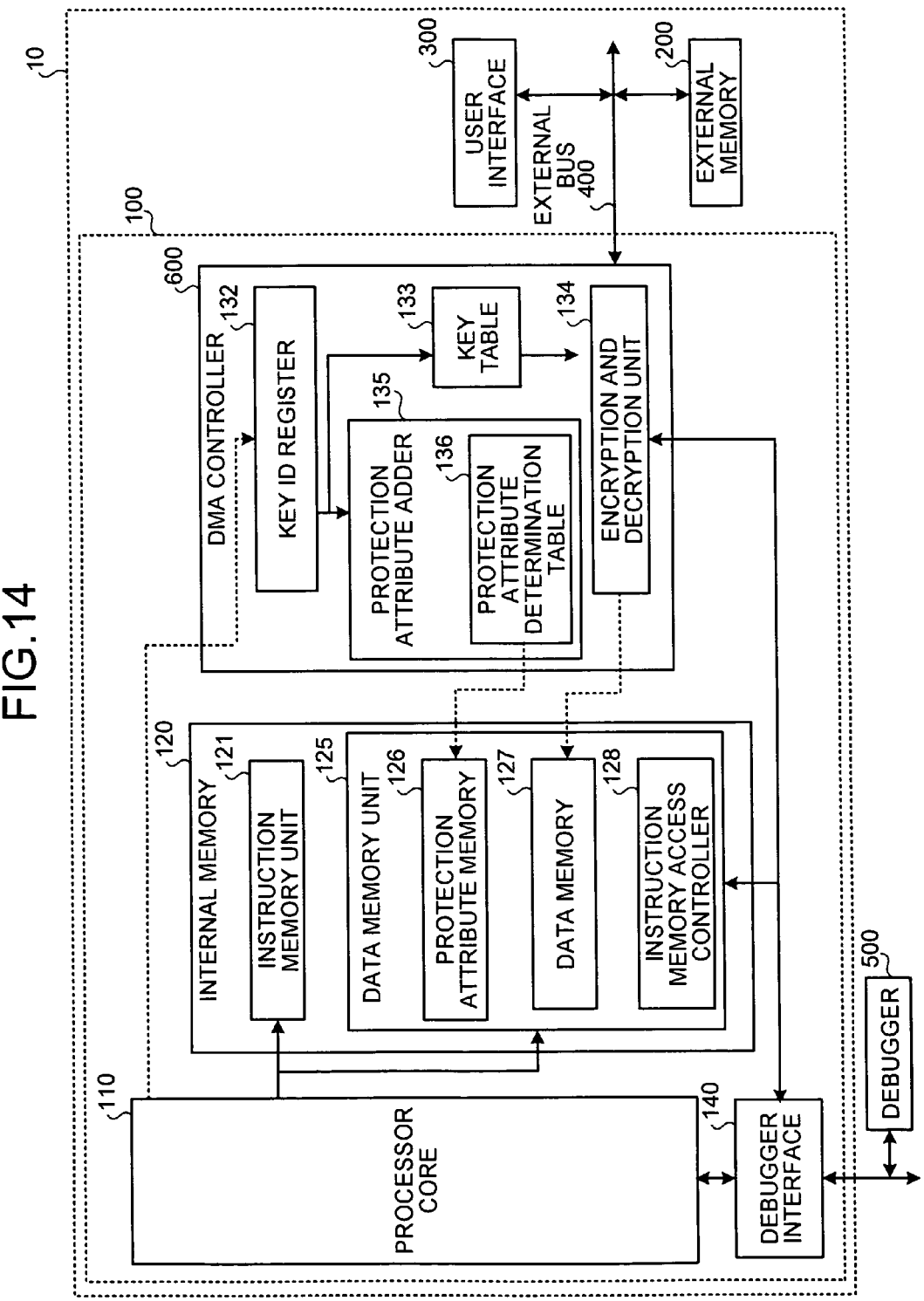
FIG. 14 is a diagram that depicts a general configuration of a system 10 according to a third modification example of a second embodiment.

In the second embodiment, access control to programs is explained. Instead, however, access control to data may be executed as a third modification example. FIG. 14 is a diagram that depicts a general configuration of a system 10 according to the third modification example. A data memory unit 125 includes a protection attribute memory 126, a data memory 127, and a data memory access controller 128 in the same way as the instruction memory unit 121.

The protection attribute memory 126 is similar to the protection attribute memory 122 in configuration and processing. The data memory 127 is similar to the instruction memory 123 in configuration and processing. The data memory access controller 128 is similar to the instruction memory access controller 124 in configuration and processing.

As another example, both access control for a program and access control for data may be executed. In this way, the subject of access control is not restricted to that in the embodiments.

If access control for data is executed as in the third modification example, it is determined in the writing processing whether to clear already retained data before writing data based on the protection attribute added to the data as shown in FIG. 11. As a fourth modification example, however, it may be determined based on the request source besides the protection attribute whether to clear the data.

Figure 15:
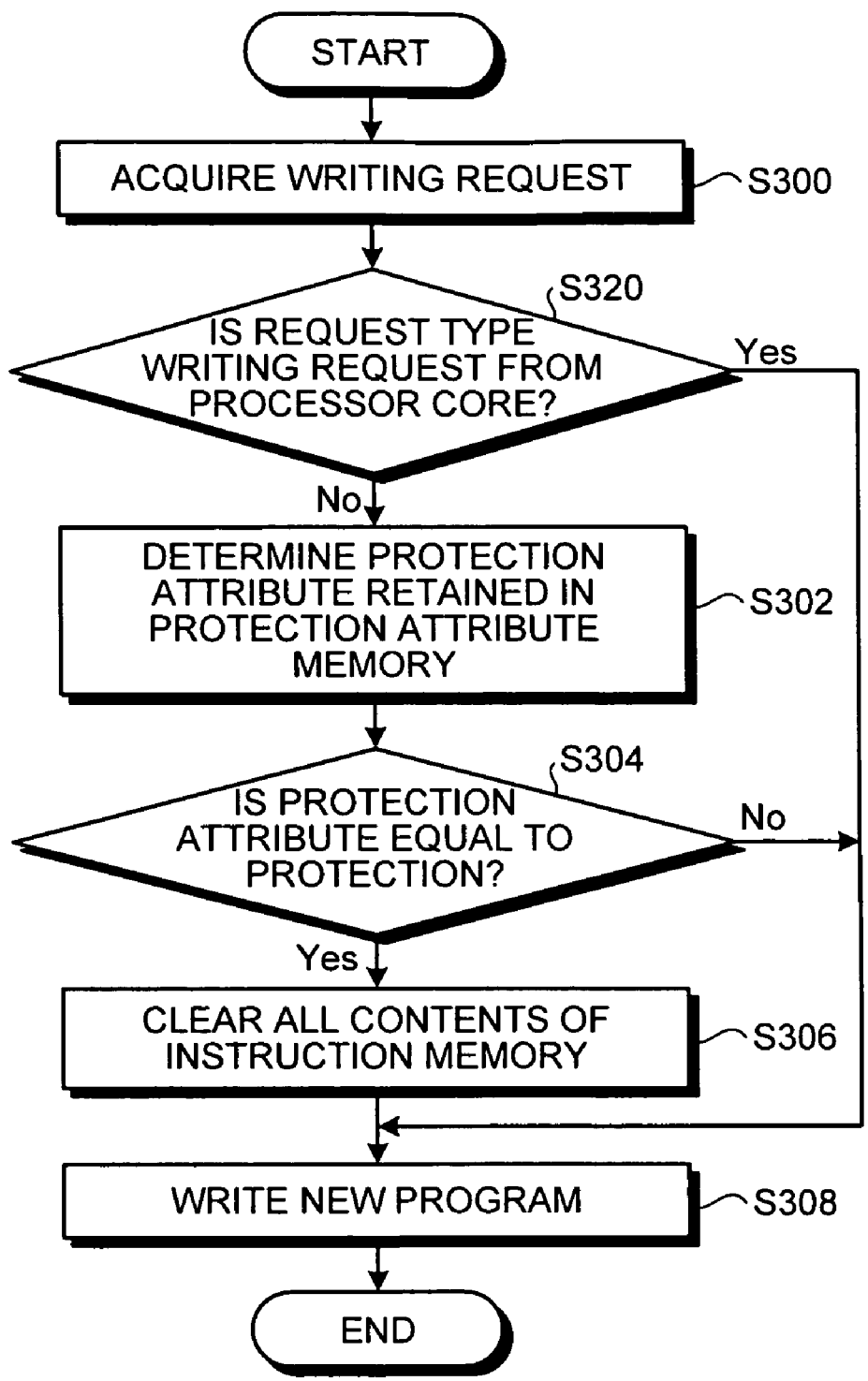
FIG. 15 is a flow chart that depicts writing processing according to a fourth modification example of a second embodiment.

FIG. 15 is a flow chart that depicts writing processing according to the fourth embodiment. If the request type of an acquired writing request is a writing request from the processor core (Yes at step S320), the processing proceeds to step S308 as shown in FIG. 15. In other words, if the request type is the writing request from the processor core 110, a new plain text program is written without executing clear processing.

Thus, by controlling access based on the request type, only access from a predetermined request type can be controlled efficiently without controlling access from other request types.

In the second embodiment, readout is prohibited as access control when a reading request for a plain text program added with a protection attribute that indicates protection is acquired provided instead, however, a program may be encrypted and added as a fifth modification example. When access control is executed, therefore, any program is not read as the plain text. As a result, it is possible to prevent a third person from reading out a plain text program illegally.

When overwriting a program in a region in which a plain text program is already retained, it is determined in the second embodiment whether to clear an already retained program before overwriting processing based on the protection attribute of the program. In addition, however, it may be determined whether to clear a program based on an order from the user.

Specifically, in executing access control on an already retained plain text program, the plain text program may be cleared only when an order to the effect that the already retained plain text program should be cleared is accepted from the user via the user interface 300. Otherwise, an error signal may be output. As a result, writing cannot be executed unless the user clears the plain text program and the plain text program can be protected.

In the second embodiment, the DMA controller 600 includes the protection attribute adder 135. Instead, the internal memory 120 may include the protection attribute adder 135 as a seventh modification example. At this time, the DMA controller 600 outputs a key ID retained in the key ID register 132 to the internal memory 120. In the internal memory 120, the protection attribute adder 135 adds a protection attribute based on the key ID acquired from the key ID register 132. The protection attribute adder 135 causes the protection attribute memory 122 to retain the added protection attribute.

Figure 16:
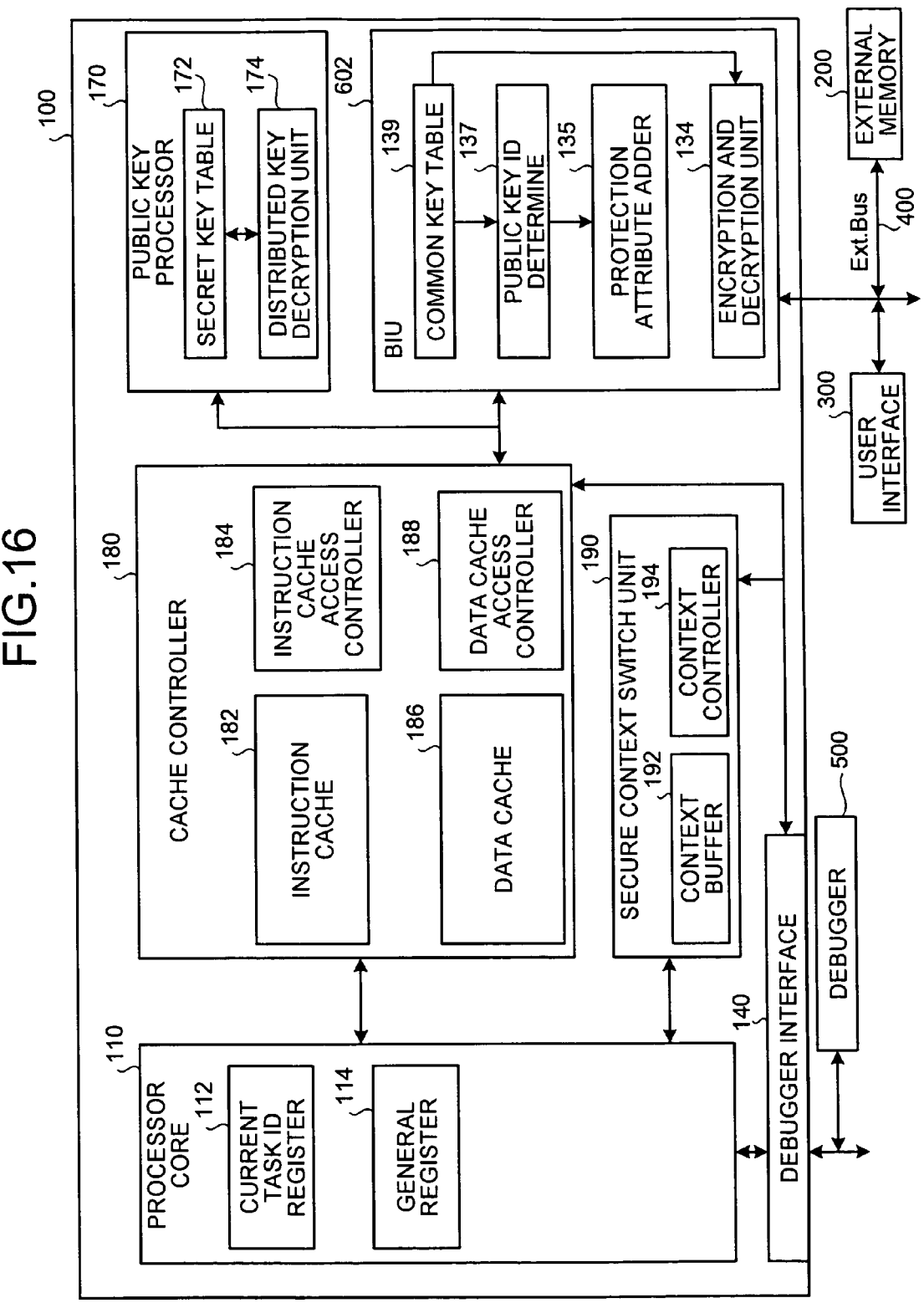
FIG. 16 is a block diagram that depicts a general configuration of a user terminal 3 according to a third embodiment.

FIG. 16 is a block diagram that depicts a general configuration of the user terminal 3 according to a third embodiment. The user terminal 3 includes a microprocessor 100, an external memory 200, a user interface 300, an external bus 400 and a debugger 500.

The microprocessor 100 includes a processor core 110, a debugger interface 140, a public key processor 170, a BIU 602, a cache controller 180 and a secure context switch unit 190.

The public key processor 170 includes a secret key table 172 and a distributed key decryption unit 174. FIG. 17 is a diagram schematically that depicts a data configuration of the secret key table 172. The secret key table 172 retains a plurality of secret keys and public keys in association. In addition, the secret key table 172 retains public key IDs identifying public keys in association with the public keys.

In the present embodiment, a public key for development and a secret key for development are retained in association with a public key ID "1" and a public key for product and a secret key for product are retained in association with a public key ID "2."

The distributed key decryption unit 174 decrypts a distributed key by using a secret key retained in the secret key table 172 based on a user given by the user, and obtains a public key. The user terminal acquires a public key as the distributed key.

Hereafter, a distributed key encrypted by using the public key for development is used as the distributed key for development, and a distributed key encrypted by using the public key for product is used as the distributed key for product. A program encrypted by using a public key included in the distributed key for development is used as a development key encrypted program, and a program encrypted by using a common key included in the distributed key for product is used as a product key encrypted program.

The BIU 602 includes a common key table 139, a public key ID determiner 137, a protection attribute adder 135 and an encryption and decryption unit 134.

FIG. 18 is a diagram schematically that depicts a data configuration of the common key table 139. The common key table 139 retains task IDs, public key IDs and common keys in association. The public key processor 170 gives a message of the task ID.

Upon receiving a specified task ID from the public key processor 170, the encryption and decryption unit 134 decrypts an encrypted program by using a common key associated with the specified task ID in the common key table 139 and obtains a plain text program. The encryption and decryption unit 134 outputs the plain text program to the cache controller 180.

Upon receiving a specified task ID from the public key processor 170, the public key ID determiner 137 determines a public key ID associated with the specified task ID.

The protection attribute adder 135 adds a protection attribute based on the public key ID determined by the public key ID determiner 137. Specifically, the protection attribute adder 135 adds a plain text program with a protection attribute "0," which indicates non-protection. The protection attribute adder 135 adds a program corresponding to the public key ID for development as well with the protection attribute "0," which indicates non-protection. The protection attribute adder 135 adds a program corresponding to the public key ID for product with the protection attribute "1," which indicates protection. The protection attribute adder 135 outputs the protection attribute to the cache controller 180.

The cache controller 180 includes an instruction cache 182, an instruction cache access controller 184, a data cache 186 and a data cache access controller 188.

FIG. 19 schematically depicts a data configuration of the instruction cache 182. The instruction cache 182 has regions in which address tags, programs and protection attributes are retained. The instruction cache access controller 184 controls access to the instruction cache 182 from the outside. In other words, the instruction cache access controller 184 controls reading and writing of a program retained in the instruction cache 182.

The processor core 110 includes a current task ID register 112 and a general purpose register 114. The current task ID register 112 retains a task ID of a task under execution. The general purpose register 114 retains the program under execution.

The secure context switch unit 190 includes a context buffer 192 which retains a context, and a context controller 194 which executes control between the processor core 110 and the context buffer 192. When an interrupt is issued, the context controller 194 reads out contents of the general purpose register 114 in the processor core 110, writes the contents into the context buffer 192, and clears the contents of the general purpose register 114. When an instruction is issued to resume the task, the context controller 194 restores the context stored in the context buffer 192 to the general purpose register 114.

FIG. 20 schematically depicts a rule for access control in the instruction cache access controller 184. If the protection attribute indicates non-protection, namely, if the program is a program acquired from the external memory 200 as a plain text program or a program acquired from the external memory 200 as a development key encrypted program, access to the program is permitted. If the request type is instruction fetch executed by the processor core 110 and the protection attribute indicates protection, namely, if the program is a program acquired from the external memory 200 as a product key encrypted program, access to the program is permitted.

On the other hand, if the request type is not instruction fetch executed by the processor core 110 and the protection attribute indicates protection, access to the program is restricted. In other words, an error signal is output.

Figure 21:
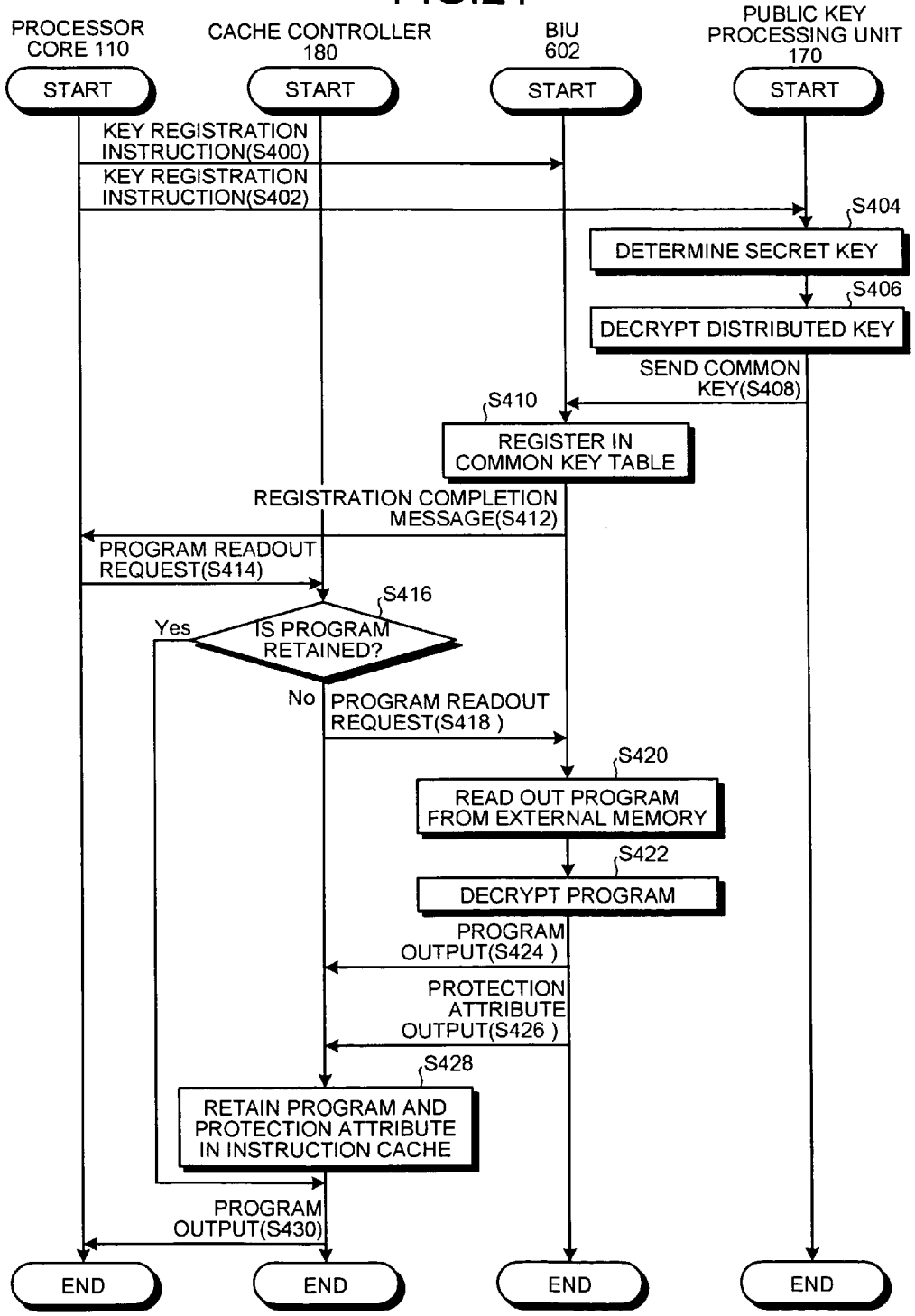
FIG. 21 is a flow chart that depicts processing executed in debugging at the time of software development in a software vendor 2 according to a third embodiment.

FIG. 21 is a flow chart that depicts processing executed in the software vendor 2 according to the third embodiment when executing debugging at the time of software development When executing debugging, a program P to be protected is previously encrypted by using a unique common key Kx to obtain a development key encrypted program E(Kx, P). K including Kx is encrypted by using a public key for development Kp1 to obtain a distributed key for development E(Kp1, K). The development key encrypted program E(Kx, P) is retained in the external memory 200. The distributed key for development E(Kp1, K) is retained in the external memory 200. Here, E(X, Y) denotes data obtained by encrypting data Y by using a key X.

The software vendor 2 stores the created program E(Kx, P) and the distributed key for development E(Kp1, K) in the external memory 200. The software vendor 2 specifies a suitable task ID and a suitable distributed key for development E(Kp1, K), and issues a key registration instruction (step S400).

At this time, the processor core 110 further issues a key registration instruction to the public key processor 170 (step S402). The public key processor 170 determines a secret key associated in the secret key table 172 with a public key ID indicated in the key registration instruction (step S404). The distributed key decryption unit 174 decrypts the distributed key for development E(Kp1, K) by using the secret key to obtain a common key Kx (step S406). The distributed key for development E(Kp1, K) is acquired from the external memory 200. Thus, in the present embodiment, a common key is acquired from the external memory 200 as the distributed key for development E(Kp1, K).

The public key processor 170 gives a message of the common key Kx, the task ID and the public key ID to the BIU 602 (step S408).

The BIU 602 registers the information given as a message in the common key table 139 (step S410). The BIU 602 notifies the processor core 110 of the registration completion (step S412).

The processor core 110 starts execution of the program by issuing a start address of the program with a current task ID and a start address of the program specified to the cache controller 180. In the program start instruction, for example, a current task ID "3" and a program start address "X1" are specified.

After issuing the program start instruction, the processor core 110 causes the current task ID register 112 retain the specified current task ID. The processor core 110 sends a program reading request with the task ID and the reading start address specified to the cache controller 180 (step S414).

If the program specified in the reading request is not retained in the instruction cache (No at step S416), the cache controller 180 sends a reading request for the program to the BIU 130 (step S418). The reading request sent to the BIU 602 includes a flag that indicates that the subject is a program, the task ID and the start address.

In response to the reading request from the cache controller 180, the BIU 602 reads out a program located at the start address from the external memory 200 (step S420). The encryption and decryption unit 134 selects a common key Kx corresponding to the task ID from the common key table 139, and decrypts the program read out from the external memory 200 (step S422).

The encryption and decryption unit 134 outputs the decrypted program to the cache controller 180 (step S424). The public key ID determiner 137 determines the public key ID based on the task ID. The protection attribute adder 135 adds the decrypted program with a protection attribute based on the public key ID determined by the public key ID determiner 137. The protection attribute adder 135 outputs the added protection attribute to the cache controller 180 (step S426).

The cache controller 180 retains the program and the protection attribute acquired from the BIU 602 in the instruction cache 182 (step S428). The cache controller 180 outputs the program to the processor core 110 (step S430).

If the program specified in the reading request is retained in the instruction cache 182 in the cache controller 180 at the step S416 (Yes at the step S416), the processing proceeds to the step S430. Thus, the processing of reading the program is completed.

Figure 22:
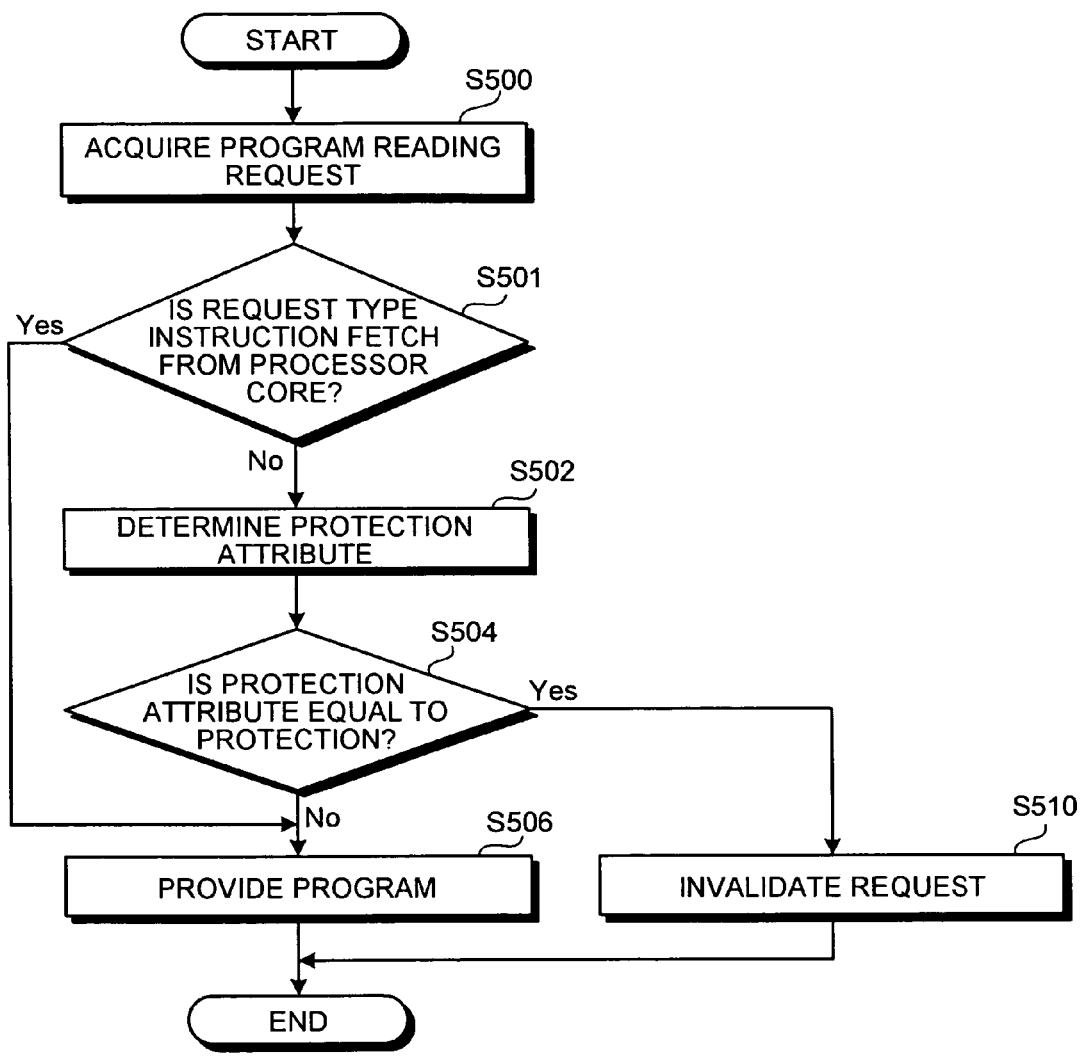
FIG. 22 is a flow chart that depicts reading processing executed by a cache controller 180 when a program reading request is acquired.

FIG. 22 is a flow chart that depicts reading processing executed by the cache controller when a reading request for a program is acquired. Upon acquiring a reading request indicating readout of a program retained in the instruction cache 182 (step S500), the instruction cache access controller 184 in the instruction cache 182 determines whether the request type is instruction fetch executed by the processor core 110. Specifically, the request type may be determined by, for example, physical wiring. If the request type is instruction fetch executed by the processor core 110 (Yes at step S501), the instruction cache access controller 184 outputs a plain text program retained in the instruction cache 182 to the processor core 110 (step S506). If the request type is not instruction fetch executed by the processor core 110 (No at step S501), the instruction cache access controller 184 determines the protection attribute of the program retained in the instruction cache 182 (step S502). If the protection attribute that indicates protection is added (Yes at step S504), the instruction cache access controller 184 outputs an error signal (step S510).

On the other hand, if the protection attribute that indicates non-protection is added (No at the step S504), the instruction cache access controller 184 adds the program retained in the instruction cache 182 (step S506). Thus, the reading processing executed by the cache controller is completed.

If the subject is a development key encrypted program, the program has a protection attribute that indicates non-protection added to it. Upon acquiring the reading request for that program from the debugger 500, therefore, the cache controller 180 adds the debugger 500 with the program (No at the step S504 and the step S506).

On the other hand, if the subject is a product key encrypted program, the program has a protection attribute that indicates protection added to it Upon acquiring the reading request for that program from the debugger 500, therefore, the cache controller 180 outputs an error signal (Yes at the step S504 and the step S510).

By thus providing the public key for development and the public key for product with different public key IDs and providing protection attributes based on the values of the public key IDs, only the product key encrypted program can be restricted in analysis.

In the third embodiment, access to the program retained in the instruction cache 182 is controlled. As a first modification example for the third embodiment, access to the data retained in the data cache 186 may be controlled in the same way. At this time, processing executed in the data cache 186 and the data cache access controller 188 is similar to that executed in the instruction cache 182 and the instruction cache access controller 184.

A user terminal 3 according to a fourth embodiment is explained. The user terminal 3 according to the fourth embodiment is similar in configuration to the user terminal 3 according to the third embodiment.

The user terminal 3 according to the fourth embodiment reads out information of a plurality of types from the external memory 200, and determines whether to decrypt the information based on the type of the information. In this respect, the user terminal 3 according to the fourth embodiment differs from the user terminal 3 according to other embodiments.

Figure 23:
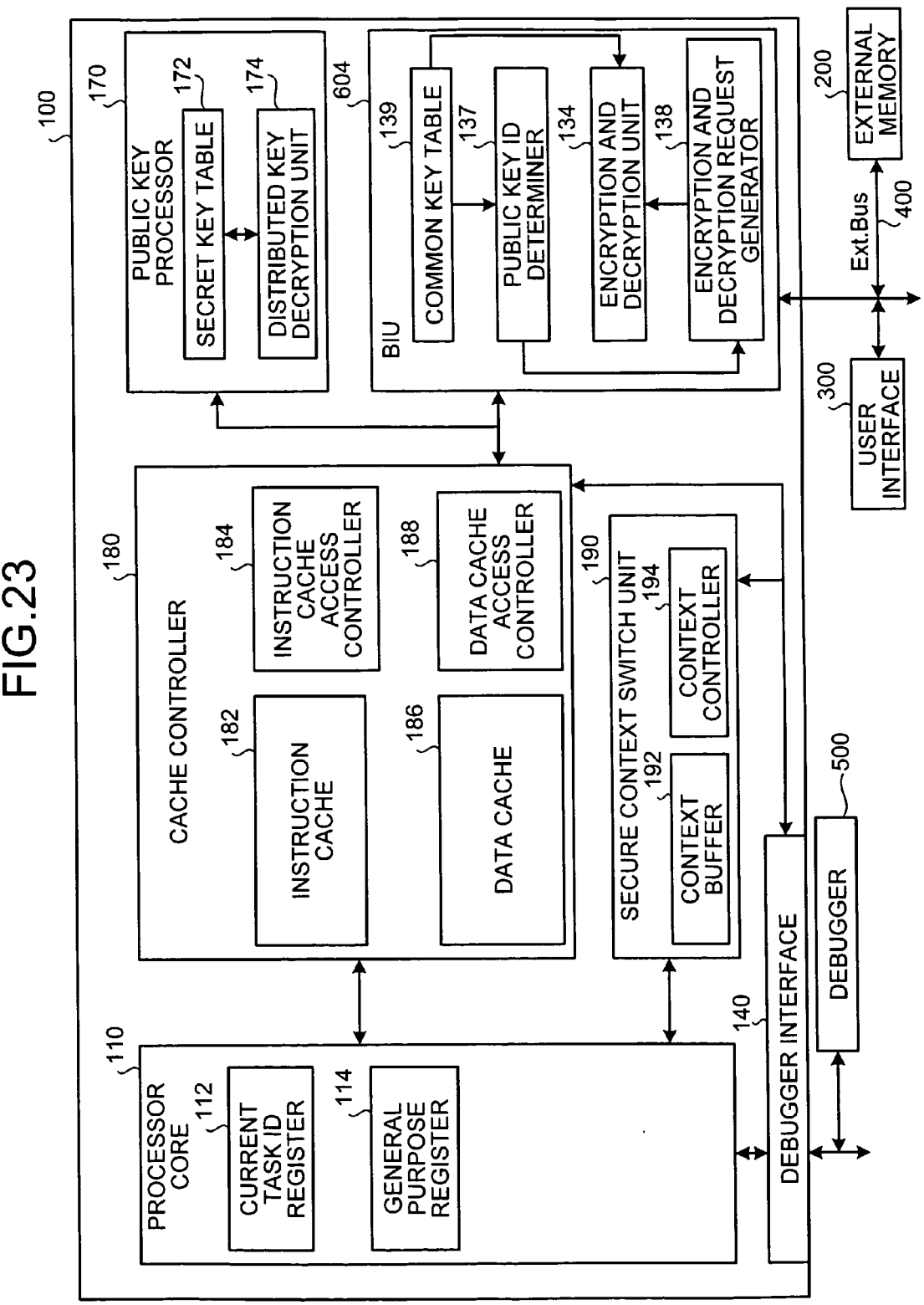
FIG. 23 is a block diagram that depicts a general configuration of a user terminal 3 according to a fourth embodiment.

FIG. 23 is a block diagram that depicts a general configuration of the user terminal 3 according to the fourth embodiment. A BIU 604 in the user terminal 3 according to the fourth embodiment further includes an encryption and decryption request generator 138 besides the configuration of the BIU 602 in the third embodiment The encryption and decryption request generator 138 issues a request as to whether to conduct encryption and decryption in an encryption and decryption unit 134 to the encryption and decryption unit 134.

Figure 24:
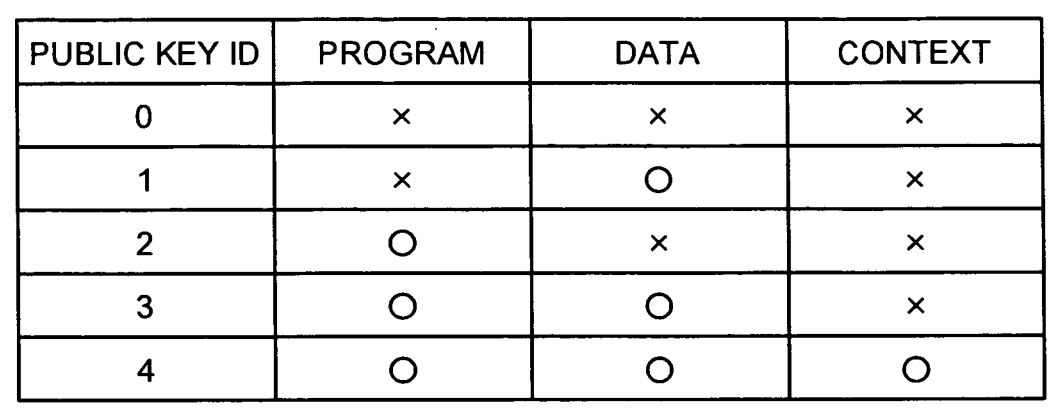

FIG. 24 schematically depicts a rule to be used for the encryption and decryption request generator 138 to determine whether to conduct encryption and decryption. For example, if the public key ID is "0" and the subject information is a program, the encryption and decryption request generator 138 generates a through request. In other words, for a program encrypted by using a public key identified by the public key ID "0," the encryption and decryption unit 134 does not conduct encryption and decryption. If the public key ID is "2" and the subject information is a program, the encryption and decryption request generator 138 generates an encryption and decryption request. In other words, for a program encrypted by using a public key identified by the public key ID "2," the encryption and decryption unit 134 executes encryption and decryption.

In this way, the processing in the encryption and decryption unit 134 can be controlled based on the public key ID associated with the task ID and the type of information that becomes the subject Specifically, it can be determined whether to conduct encryption processing and decryption processing in the encryption and decryption unit 134.

Figure 25:
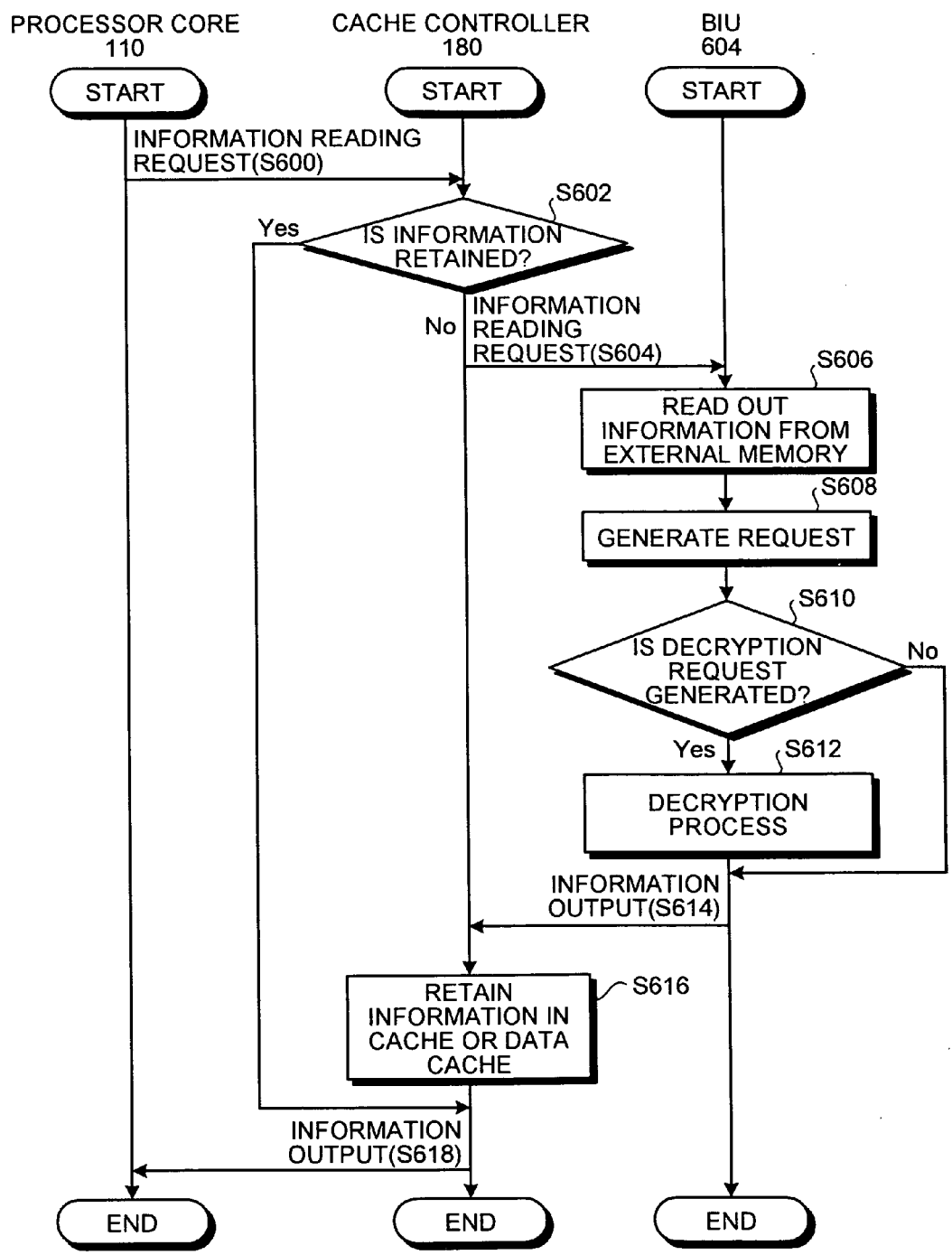
FIG. 25 is a flow chart that depicts processing of reading information into a processor core 110 in a user terminal 3 according to a fourth embodiment.

FIG. 25 is a flow chart that depicts processing of reading information into the processor core 110 in the user terminal 3 according to the fourth embodiment. Processing of registering keys is similar to processing of registering keys executed by the software vendor 2 according to the third embodiment and explained with reference to FIG. 21.

After the keys are registered, the processor core 110 outputs an information reading request to the cache controller 180 (step S600). Upon acquiring the information reading request, the cache controller 180 determines whether information requested by the information reading request is retained. If the requested information is retained (Yes at step S602), the cache controller 180 outputs an information reading request to the BIU 604 (step S604).

The BIU 604 outputs an information reading request to the external memory 200, and acquires information requested by the external memory 200 (step S606). The encryption and decryption request generator 138 generates a request to be output to the encryption and decryption unit 134 based on the rule explained with reference to FIG. 24 (step S608).

If the encryption and decryption request generator 138 generates a decryption request and outputs the decryption request to the encryption and decryption unit 134 (Yes at step S610), the encryption and decryption unit 134 decrypts the information acquired from the external memory 200 (step S612), and outputs the decrypted information to the cache controller 180 (step S614).

On the other hand, if the encryption and decryption request generator 138 generates a through request and outputs the through request (No at the step S610), the encryption and decryption unit 134 outputs the information acquired from the external memory 200 to the cache controller 180 without decrypting it (step S614).

The cache controller 180 causes the instruction cache 182 or the data cache 186 to retain the information acquired from the BIU 604 (step S616). The cache controller 180 outputs the information acquired from the BIU 604 to the processor core 110 (step S618). Thus, the processing of reading information into the processor core 110 is completed.

Figure 26:
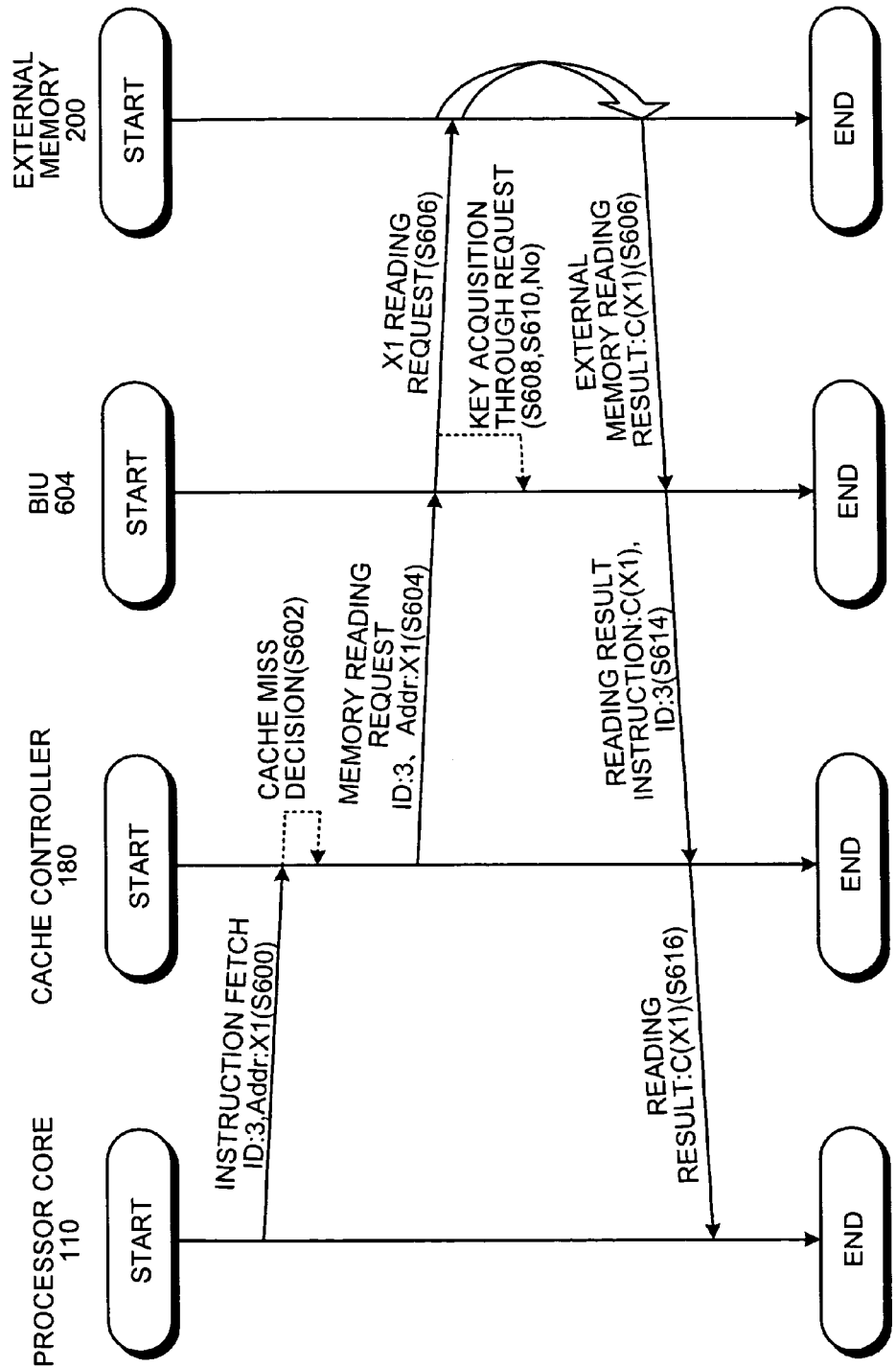
FIG. 26 is a flow chart that depicts processing executed when a task ID "3" and a start address "X1" are specified in an information reading request output by a processor core 110.

Processing executed when a task ID "3" and a start address "X1" are specified in an information reading request output by the processor core 110 is explained with reference to FIG. 26. The subject information of the reading request is a program.

If a program start instruction is issued, the processor core 110 retains the input task ID in the current task ID register 112 and outputs the information reading request to the cache controller 180 (step S600).

Since a valid and pertinent program is not retained in the instruction cache 182 (No at step S602), the cache controller 180 outputs an information reading request including a flag that indicates that the subject is a program, the task ID "3" and the start address "X1" to the BIU 604 (step S604). By outputting an information reading request including the start address "X1" to the external memory 200, the BIU 604 acquires a program C(X1), which is the request subject, from the external memory 200 (step S606).

The public key ID determiner 137 determines a public key ID "1" based on the task ID "3" and the common key table 139. The encryption and decryption request generator 138 generates a request to be output to the encryption and decryption unit 134 based on the public key ID "1" determined by the public key ID determiner 137 and the rule explained with reference to FIG. 24. Since the public key ID is "1" and the subject information is a program, the encryption and decryption request generator 138 generates a through request based on the rule shown in FIG. 24 (step S608).

Upon acquiring the through request from the encryption and decryption request generator 138, the encryption and decryption unit 134 outputs the program C(X1) and the task ID "3" to the cache controller 180 (step S614) without executing decryption processing on the program acquired from the external memory 200 (No at step S610). The cache controller 180 causes the instruction cache 182 to retain the program C(X1) and the task ID "3" read out from the external memory 200, and outputs the program C(X1) to the processor core 110 (step S616). Thus, the processing to be executed when the task ID "3" and the start address "X1" are specified is completed.

Figure 27:
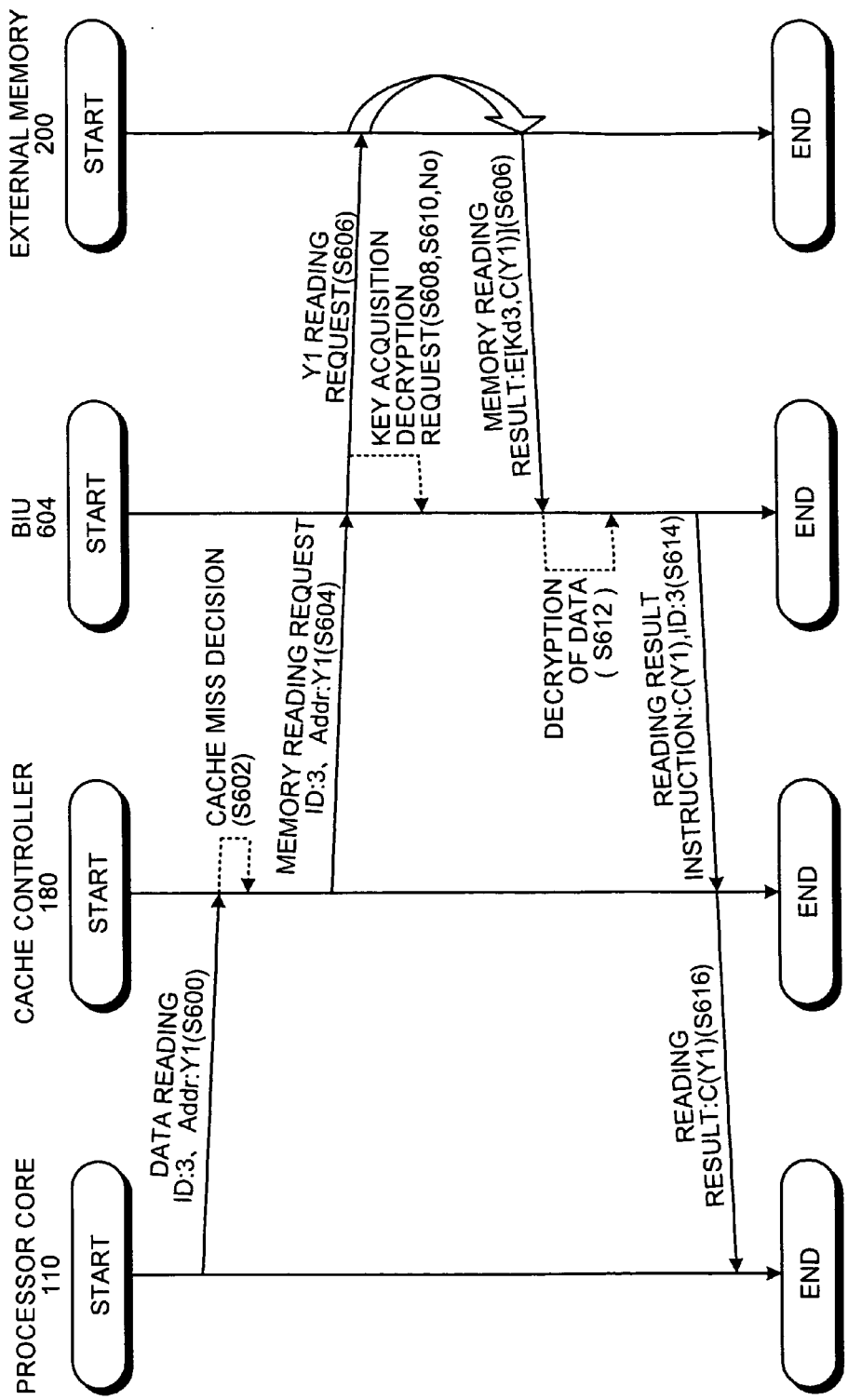
FIG. 27 is a flow chart that depicts processing executed when a task ID "3" and a start address "Y1" are specified in an information reading request output by a processor core 110.

Processing executed when the task ID "3" and the start address "Y1" are specified in an information reading request output by the processor core 110 is explained with reference to FIG. 27. The subject information of the reading request is data.

The processor core 110 outputs an information reading request to the cache controller 180 (step S600). Since valid and pertinent data is not retained in the instruction cache 182 (No at step S602), the cache controller 180 outputs an information reading request including a flag that indicates that the subject is data, the task ID "3" and the start address "Y1" to the BIU 604 (step S604).

By outputting an information reading request including the address "Y1" to the external memory 200, the BIU 604 acquires data C(Y1), which is the request subject, from the external memory 200 (step S606).

The public key ID determiner 137 determines a public key ID "1" based on the task ID "3" and the common key table 139. The encryption and decryption request generator 138 generates a request to be output to the encryption and decryption unit 134 based on the public key ID "1" determined by the public key ID determiner 137 and the rule explained with reference to FIG. 24. Since the public key ID is "1" and the subject information is data, the encryption and decryption request generator 138 generates a decryption request based on the rule shown in FIG. 24 (step S608).

Upon acquiring the decryption request from the encryption and decryption request generator 138 (Yes at step S610), the encryption and decryption unit 134 executes decryption processing on the program acquired from the external memory 200 (step S612). The encryption and decryption unit 134 outputs the data C(Y1) and the task ID "3" to the cache controller 180 (step S614).

The cache controller 180 causes the instruction cache 182 to retain the data C(Y1) and the task ID "3" read out from the external memory 200, and outputs the data C(Y1) to the processor core 110 (step S616). Thus, the processing to be executed when the task ID "3" and the start address "Y1" are specified is completed.

Thus, the user terminal 3 according to the fourth embodiment can determine whether to conduct encryption and decryption on the information based on the public key ID and the type of the information.

In order to minimize the encryption delay caused by using the encryption function and make the software operate with low cost processing capability, it is desirable to handle only program as the subject of encryption and decryption and handle the data and context as plain texts. In the user terminal according to the present embodiment, the encryption and decryption can be executed only on a program by the processing explained above.

The user terminal 3 according to the fourth embodiment is similar in the rest configuration and configuration to the user terminal 3 according to the third embodiment.

In the fourth embodiment, it is determined based on the public key ID whether to conduct the encryption and decryption processing. Instead, in a first modification example, the function in the secure context switch unit 190 may be controlled based on the public key ID. Specifically, it may be controlled whether to retain the context in the context buffer 192. It may be controlled whether to restore the context retained in the context buffer 192 to the processor core 110.

As a second modification example, the function of the cache controller 180 may be controlled based on the public key ID. Specifically, it may be controlled whether to use the task ID in access control of a program and data to the cache controller 180.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microprocessor comprising:
a processor core;
an information acquisition unit that acquires information encrypted to be used by the processor core, from outside;
a decryption unit that decrypts the information with a symmetric key to obtain plain text; and
a controller that, after the decryption unit obtains the plain text, uses the same symmetric key to determine whether to permit or restrict further processing of the obtained plain text.

2. The microprocessor according to claim 1, wherein
the information acquisition unit acquires information encrypted with a product key used for providing the information as a product, the product key being a symmetric key, and
the controller restricts processing of the obtained plain text decrypted with the product key.

3. The microprocessor according to claim 1, wherein
the information acquisition unit acquires information encrypted with a development key used for developing the information, the development key being a symmetric key, and
the controller permits processing of the obtained plain text decrypted with the development key.

4. The microprocessor according to claim 3, further comprising a development key generator that generates the development key,
wherein the controller permits processing of the obtained plain text decrypted with the development key generated by the development key generator.

5. The microprocessor according to claim 4, wherein the information acquisition unit acquires information encrypted with a product key used for providing the information as a product, the product key being a symmetric key,
the development key generator generates a development key that indicates the same value as the product key, and the controller restricts processing of the obtained plain text decrypted with the product key, and permits processing of the obtained plain text decrypted with the development key generated by the development key generator.

6. The microprocessor according to claim 1, further comprising:
an symmetric key storage unit that stores a product key used for providing the information as a product, and a development key used for developing the information, the product key and the development key being symmetric keys used by the decryption unit;
a key type table in which key identification information for identifying the symmetric keys stored in the symmetric key storage unit, and key type information indicating whether one of the symmetric keys is the development key or the product key, are registered, the key identification information and key type information being associated with each other,
wherein the controller determines key type information associated in the key type table with the one of the symmetric keys, and controls processing of the obtained plain text by the decryption unit based on the key type information.

7. The microprocessor according to claim 1, further comprising a symmetric key specification unit configured to specify the symmetric key used by the decryption unit,
wherein the decryption unit decrypts the information with the symmetric key specified by the symmetric key specification unit, and
the controller controls processing of the obtained plain text by the decryption unit based on the symmetric key specified by the symmetric key specification unit.

8. The microprocessor according to claim 1, wherein
the information acquisition unit acquires the information encrypted and the symmetric key,
the decryption unit decrypts the information with the symmetric key acquired by the information acquisition unit, and
the controller controls processing of the obtained plain text by the decryption unit based on the symmetric key acquired by the information acquisition unit.

9. The microprocessor according to claim 1, further comprising:
a plain text storage unit that stores the plain text obtained by the decryption unit;
an access request acquisition unit that acquires an access request to the plain text stored in the plain text storage unit; and
a request type determiner that determines a request type of the access request,
wherein the controller controls access to the plain text to be executed by the processor core based on the request type and the symmetric key.

10. The microprocessor according to claim 9, wherein the controller restricts access to the plain text when the request type determined by the request type determiner is a request type different from request types previously registered.

11. The microprocessor according to claim 9, wherein the controller controls access to the plain text based on the symmetric key when the request type determined by the request type determiner is a request type different from request types previously registered.

12. The microprocessor according to claim 9, wherein the controller prohibits access to the plain text based on the request type and the symmetric key.

13. The microprocessor according to claim 9, wherein the controller determines whether to output the plain text or to output information obtained by encrypting the plain text, based on the request type and the symmetric key.

14. The microprocessor according to claim 9, wherein the controller restricts overwriting on the plain text based on the request type and the symmetric key.

15. The microprocessor according to claim 9, wherein
the plain text storage unit is provided in an internal memory,
instruction fetch executed by the processor core is registered as the registration request type, and
the access controller restricts access when the request type determined by the request type determiner is not instruction fetch executed by the processor core.

16. The microprocessor according to claim 9, wherein
the controller restricts access to the plain text that is being executed by the processing core, based on the request type and the symmetric key.

17. The microprocessor according to claim 1, further comprising a cache memory that stores the information acquired by the information acquisition unit,
wherein the controller controls readout of the information stored in the cache memory based on the symmetric key.

18. The microprocessor according to claim 1, further comprising a secure context switch unit that administers saving and restoration of the information acquired by the information acquisition unit, the saving and restoration is executed by the processor core,
wherein the controller controls the saving and restoration of information in the context switch unit, based on the symmetric key.

19. The microprocessor according to claim 1, further comprising:
a distributed key acquisition unit that acquires a distributed key encrypted with a public key; and
a key decryption unit that decrypts the distributed key to obtain the symmetric key,
wherein the controller controls processing on the information based on the public key used when the key decryption unit obtains the symmetric key.

\* \* \* \* \*